(12) United States Patent
Ono

(10) Patent No.: US 10,503,028 B2
(45) Date of Patent: Dec. 10, 2019

(54) LIQUID CRYSTAL DISPLAY DEVICE

(71) Applicant: Panasonic Liquid Crystal Display Co., Ltd., Hyogo (JP)

(72) Inventor: Kikuo Ono, Ibaraki (JP)

(73) Assignee: Panasonic Liquid Crystal Dispaly Co., Ltd., Hyogo (JP)

( * ) Notice: Subject to any disclaimer, the term of this patent is extended or adjusted under 35 U.S.C. 154(b) by 54 days.

(21) Appl. No.: 15/877,402

(22) Filed: Jan. 23, 2018

(65) Prior Publication Data

US 2018/0210247 A1 Jul. 26, 2018

(30) Foreign Application Priority Data

Jan. 24, 2017 (JP) .................. 2017-010051

(51) Int. Cl.
*G02F 1/1343* (2006.01)
*G02F 1/1362* (2006.01)
*G02F 1/1335* (2006.01)

(52) U.S. Cl.
CPC ...... *G02F 1/1343* (2013.01); *G02F 1/133512* (2013.01); *G02F 1/134363* (2013.01); *G02F 1/136286* (2013.01)

(58) Field of Classification Search
CPC ............. G02F 1/1343; G02F 1/133512; G02F 1/133707; G02F 1/13471; G02F 1/136286; G02F 1/1347; G02F 2001/134372; G02F 1/134363
See application file for complete search history.

(56) References Cited

U.S. PATENT DOCUMENTS

| | | | |
|---|---|---|---|
| 2007/0063925 A1 | 3/2007 | Yoshihara et al. | |
| 2009/0147186 A1* | 6/2009 | Nakai | G02F 1/13471 349/74 |
| 2011/0261268 A1 | 10/2011 | Nakai et al. | |
| 2017/0115527 A1* | 4/2017 | Kita | G02F 1/1347 |
| 2017/0176790 A1* | 6/2017 | Guo | G02F 1/133609 |

FOREIGN PATENT DOCUMENTS

| | | |
|---|---|---|
| JP | 2015-197578 A | 11/2015 |
| WO | 2007/040127 A1 | 4/2007 |

OTHER PUBLICATIONS

Partial Translation of International Search Report for International Application No. PCT/JP2017/033571.

* cited by examiner

*Primary Examiner* — Nathanael R Briggs
(74) *Attorney, Agent, or Firm* — HEA Law PLLC

(57) ABSTRACT

A liquid crystal display device includes: a first display panel displaying a color image; and a second display panel displaying a monochrome image. Each of the first and the second display panels includes: source lines extending in a first direction; gate lines extending in a second direction; pixels; and pixel electrodes. Each of pixel electrodes among at least one of the first display panel and the second display panel, includes slits extending in the first direction. Each of pixel electrodes includes: a first edge and a second edge that are opposed to each other and extend in the first direction; a third edge connecting one ends of the first edge and the second edge; and a fourth edge connecting another ends of the first edge and the second edge. The third edge and the fourth edge are respectively inclined at predetermined angles with respect to the second direction.

17 Claims, 26 Drawing Sheets

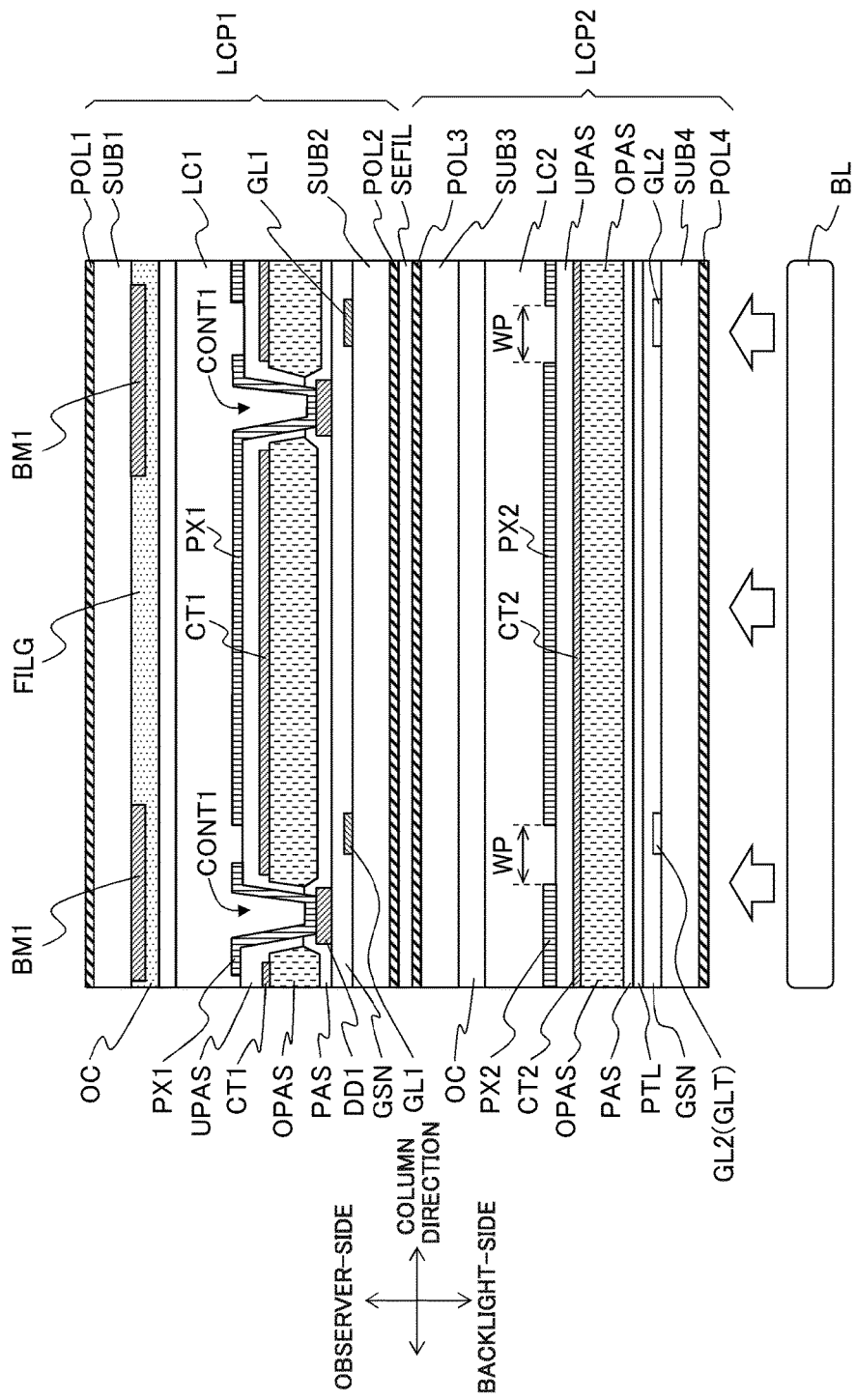

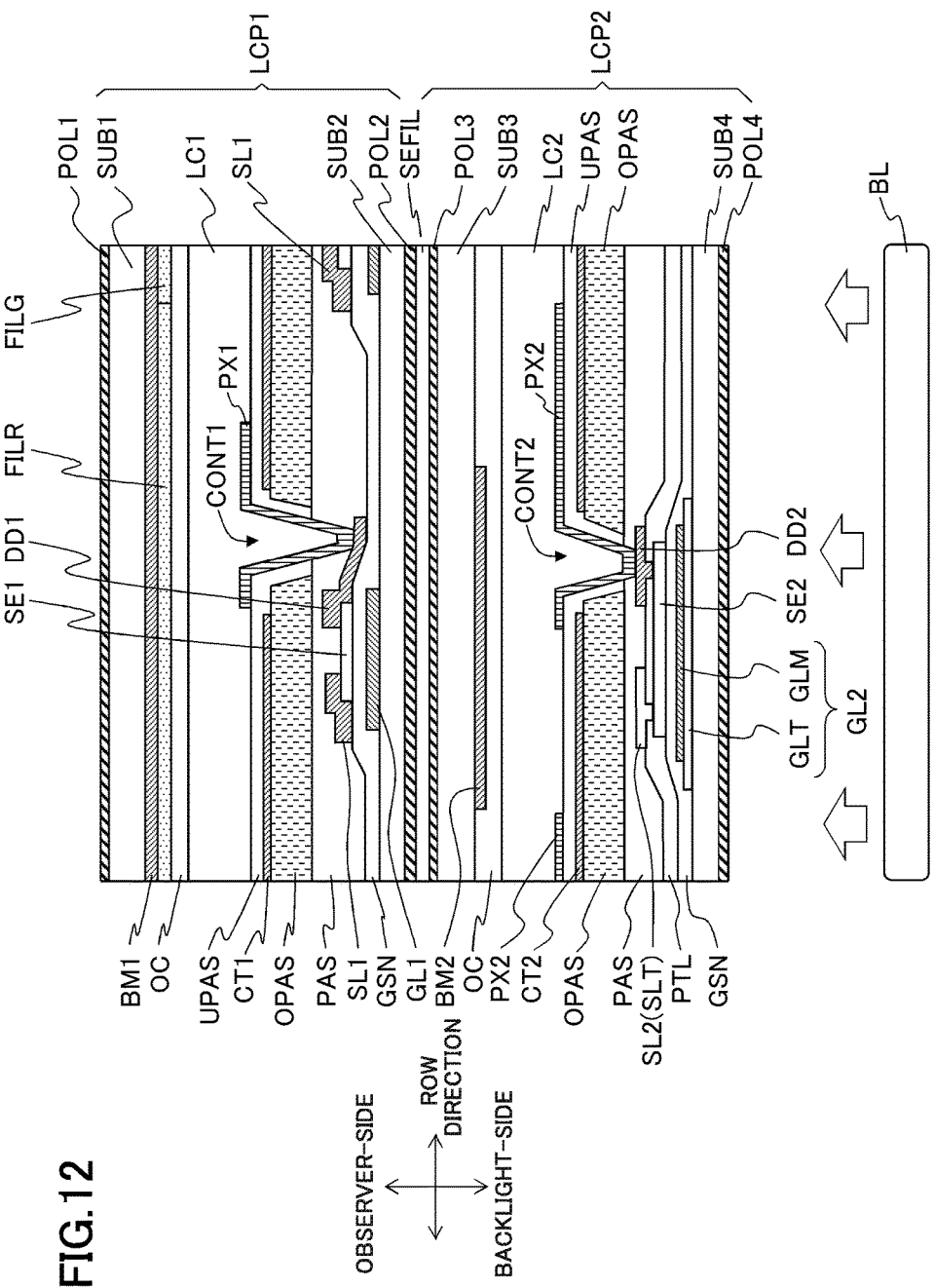

LIQUID CRYSTAL DISPLAY DEVICE

CROSS-REFERENCE TO RELATED APPLICATION

This application claims priority from Japanese application JP 2017-010051, filed Jan. 24, 2017. This Japanese application is incorporated herein by reference.

TECHNICAL FIELD

The present invention relates to a liquid crystal display device.

BACKGROUND

A technology, in which two display panels overlap each other and an image is displayed on each display panel based on an input video signal, is conventionally proposed to improve contrast of a liquid crystal display device (for example, see WO2007/040127). Specifically, for example, a color image is displayed on a front-side (observer-side) display panel in two display panels disposed back and forth, and a black-and-white image is displayed on a rear-side (backlight-side) display panel, thereby improving contrast.

SUMMARY

In the liquid crystal display device, parallax increases because a distance between a black matrix of the front-side display panel and a black matrix or a wiring (a source line, a gate line) of the rear-side display panel increases, for example. As a result, in particular, when the liquid crystal display device is obliquely viewed, the black matrix or wiring of the rear-side display panel is easily seen through a pixel opening of the display panel. This allows periodical light and shade (what is called moire) of luminance to be easily visually recognized. Even in a liquid crystal display device constructed with one display panel, moire may be visually recognized due to the parallax corresponding to a distance between a black matrix and a wiring (a source line, a gate line).

The present disclosure provides a liquid crystal display device that can reduce moire.

To solve the above problem, a liquid crystal display device according to a first disclosure comprises: a first display panel; and a second display panel that is opposed to the first display panel. The first display panel includes: a plurality of first source lines extending in a first direction; a plurality of first gate lines extending in a second direction different from the first direction; a plurality of first pixels that are divided by the plurality of first source lines and the plurality of first gate lines; and a plurality of first pixel electrodes each of which is disposed in a corresponding one of the plurality of first pixels. The second display panel includes: a plurality of second source lines extending in the first direction; a plurality of second gate lines extending in the second direction; a plurality of second pixels that are divided by the plurality of second source lines and the plurality of second gate lines; and a plurality of second pixel electrodes each of which is disposed in a corresponding one of the plurality of second pixels. Each of the plurality of second pixel electrodes is provided with a plurality of slits extending in the first direction, and includes: a first edge extending in the first direction; a second edge that is opposite to the first edge and extends in the first direction; a third edge that connects one ends of the first edge and the second edge; and a fourth edge that connects another ends of the first edge and the second edge. At least one of the third edge and the fourth edge is inclined at predetermined angles with respect to the first direction and the second direction.

In the liquid crystal display device according to the first disclosure, the other of the third edge and the fourth edge may be inclined at predetermined angles with respect to the first direction and the second direction.

In the liquid crystal display device according to the first disclosure, the third edge and the fourth edge may be parallel to each other.

In the liquid crystal display device according to the first disclosure, the first display panel may display color image and the second display panel may display black and white image.

In the liquid crystal display device according to the first disclosure, each of the plurality of second pixel electrodes may have an outer shape of a parallelogram constructed with the first edge, the second edge, the third edge, and the fourth edge.

In the liquid crystal display device according to the first disclosure, the first display panel may include a first liquid crystal layer having a plurality of first liquid crystal molecules, the second display panel may include a second liquid crystal layer and a plurality of second liquid crystal molecules, and a rotation direction of the second liquid crystal molecules overlapping at a boundary in planar view, the boundary being a region between two of the plurality of second pixel electrodes adjacent in the first direction, may be identical to a rotation direction of the second liquid crystal molecules overlapping with the two of the plurality of second pixel electrodes in planar view.

In the liquid crystal display device according to the first disclosure, the rotation direction of the plurality of second liquid crystal molecules may be identical to each other in a whole display region.

In the liquid crystal display device according to the first disclosure, the rotation direction of the second liquid crystal molecules overlapping with the two of the plurality of second pixel electrodes in planar view may be identical to a rotation direction of the first liquid crystal molecules overlapping with a part of the plurality of first pixel electrodes which overlap with the two of the plurality of second pixel electrodes in planar view In the liquid crystal display device according to the first disclosure, at least one of the second source line and the second gate line may be made of a light transmitting material.

In the liquid crystal display device according to the first disclosure, the other of the second source line and the second gate line may include a metallic wiring made of a metallic material that does not transmit light.

In the liquid crystal display device according to the first disclosure, a width of the metallic wiring may be narrower than a width of the first source line or the first gate line, which overlaps the metallic wiring in planar view.

In the liquid crystal display device according to the first disclosure, each of the second source line and the second gate line may include a transparent wiring made of a light transmitting material and a metallic wiring overlapping the transparent wiring and being made of a metallic material that does not transmit light.

In the liquid crystal display device according to the first disclosure, the first display panel may further include a black matrix, and a width of the metallic wiring may be less than or equal to one third of a width of the black matrix overlapping the metallic wiring in planar view.

In the liquid crystal display device according to the first disclosure, a second source line among the plurality of second source lines may be disposed between adjacent two first source lines of the plurality of first source lines in planar view.

In the liquid crystal display device according to the first disclosure, the plurality of first liquid crystal molecules may be positive type liquid crystal molecules, and the plurality of second liquid crystal molecules may be negative type liquid crystal molecules.

In the liquid crystal display device according to the first disclosure, the predetermined angles may be larger than an angle formed between the second directions and an initial alignment direction of the plurality of second liquid crystal molecules.

To solve the above problem, a liquid crystal display device according to a second disclosure comprises: a first display panel; and a second display panel that is opposed to the first display panel. The first display panel includes: a plurality of first source lines extending in a first direction; a plurality of first gate lines extending in a second direction different from the first direction; a plurality of first pixels that are divided by the plurality of first source lines and the plurality of first gate lines; a plurality of first pixel electrodes each of which is disposed in a corresponding one of the plurality of first pixels; and a first liquid crystal layer having a plurality of first liquid crystal molecules. The second display panel includes: a plurality of second source lines extending in the first direction; a plurality of second gate lines extending in the second direction; a plurality of second pixels that are divided by the plurality of second source lines and the plurality of second gate lines; a plurality of second pixel electrodes each of which is disposed in a corresponding one of the plurality of second pixels; and a second liquid crystal layer having a plurality of second liquid crystal molecules. A rotation direction of the second liquid crystal molecules overlapping at a boundary in planar view, the boundary being a region between two of the plurality of second pixel electrodes adjacent in the first direction, is identical to a rotation direction of the second liquid crystal molecules overlapping with the two of the plurality of second pixel electrodes in planar view.

To solve the above problem, a liquid crystal display device according to a third disclosure comprises: a plurality of source lines extending in a first direction; a plurality of gate lines extending in a second direction different from the first direction; a plurality of pixels that are divided by the plurality of source lines and the plurality of gate lines; and a plurality of pixel electrodes each of which is disposed in a corresponding one of the plurality of pixels. Each of the plurality of pixel electrodes is provided with a plurality of slits extending in the first direction, and includes: a first edge extending in the first direction; a second edge that is opposite to the first edge and extends in the first direction; a third edge that connects one ends of the first edge and the second edge; and a fourth edge that connects another ends of the first edge and the second edge. At least one of the third edge and the fourth edge is inclined at predetermined angles with respect to the first direction and the second direction.

BRIEF DESCRIPTION OF THE DRAWINGS

FIG. 11 is a sectional view taken along line XI-XI' in FIGS. 7A and 8A;

FIG. 12 is a sectional view taken along line XII-XII' in FIGS. 7A and 8A;

DETAILED DESCRIPTION

Hereinafter, exemplary embodiments of the present disclosure will be described with reference to the drawings. A liquid crystal display device of each exemplary embodiment described below includes a plurality of display panels that display images, a plurality of driving circuits (a plurality of source drivers and a plurality of gate drivers) that drive the display panels, a plurality of timing controllers that control the driving circuits, an image processor that performs image processing on an input video signal input from an outside and outputs image data to each of the timing controllers, and a backlight that irradiates the plurality of display panels with light from a rear surface side. When viewed from the observer side, the plurality of display panels are disposed while overlapping each other in a front-back direction. An image is displayed on each of the display panels. Liquid crystal display device LCD including two display panels will be described below by way of example. The number of display panels is not limited to at least two, but it may be one.

Figure 1:
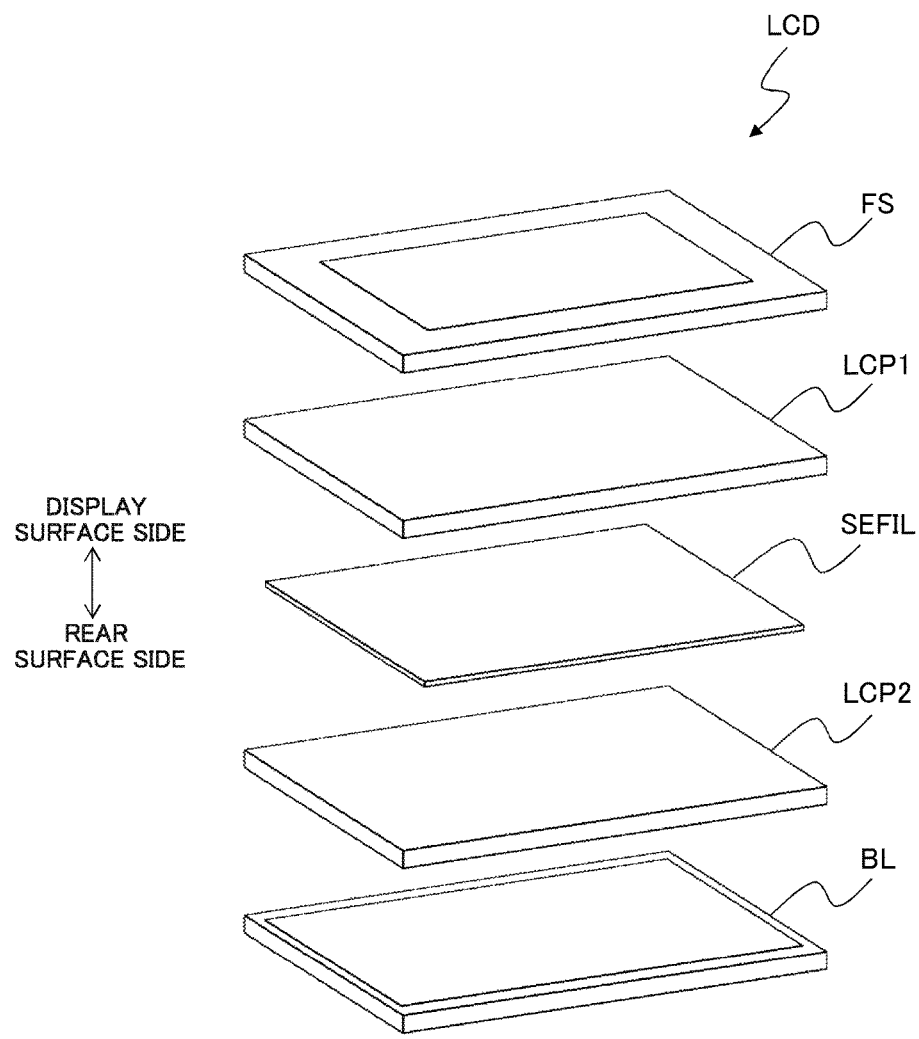
FIG. 1 is a perspective view illustrating a schematic configuration of a liquid crystal display device according to the first exemplary embodiment.

FIG. 1 is a perspective view illustrating a schematic configuration of liquid crystal display device LCD of the present exemplary embodiment. As illustrated in FIG. 1, liquid crystal display device LCD includes front-side display panel LCP1 which is disposed at a position (front side) closer to an observer, rear-side display panel LCP2 which is disposed at a position (rear side) farther away from the observer than display panel LCP1 is, adhesive layer SEFIL in which display panel LCP1 and display panel LCP2 adhere to each other, backlight BL disposed on the rear surface side of display panel LCP2, and front chassis FS that covers display panel LCP1 and display panel LCP2 from the display surface side.

Figure 2:
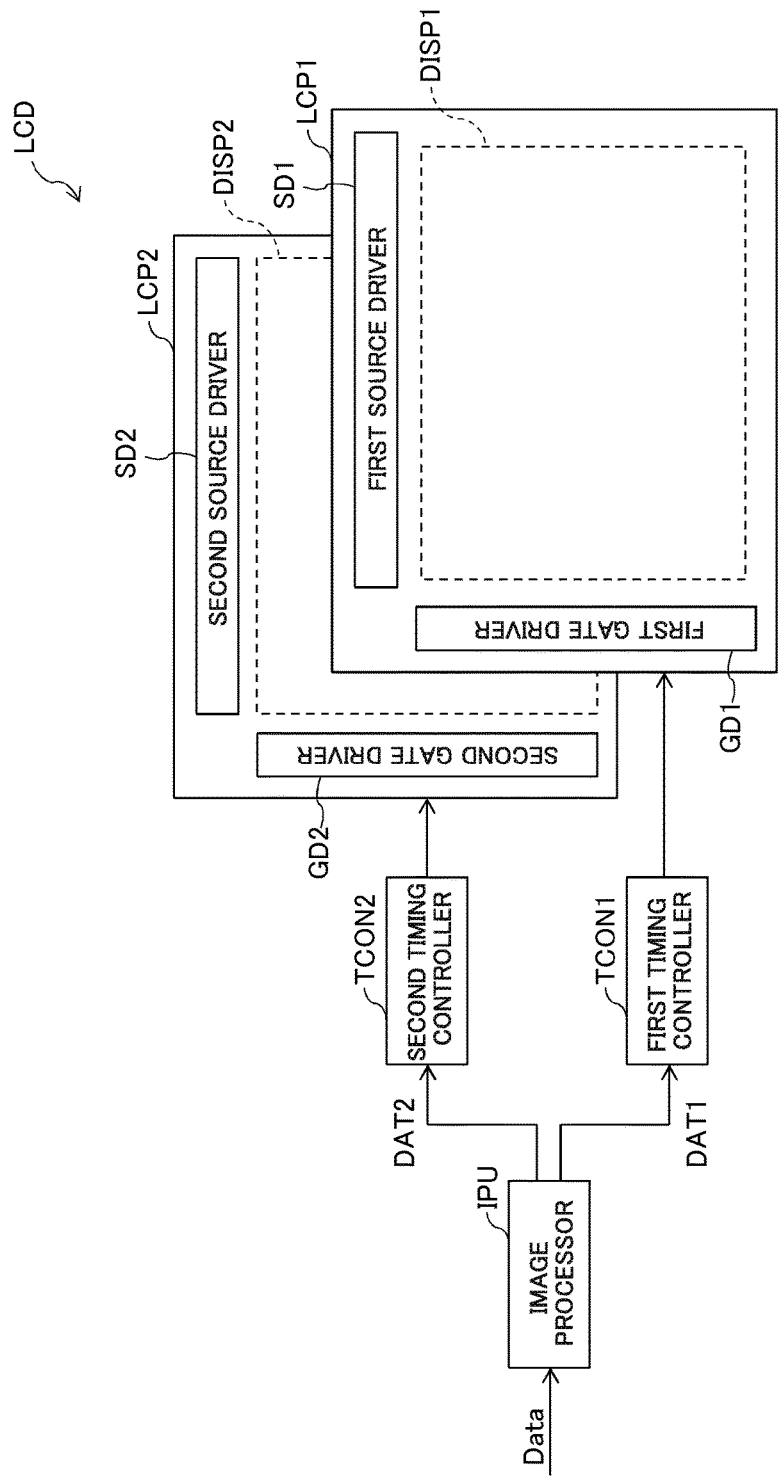
FIG. 2 is a view illustrating the schematic configuration of the liquid crystal display device according to the first exemplary embodiment.

FIG. 2 is a view illustrating the schematic configuration of liquid crystal display device LCD of the present exemplary embodiment. As illustrated in FIG. 2, display panel LCP1 includes first source driver SD1 and first gate driver GD1, and display panel LCP2 includes second source driver SD2 and second gate driver GD2. In addition, liquid crystal display device LCD includes first timing controller TCON1 that controls first source driver SD1 and first gate driver GD1, second timing controller TCON2 that controls second source driver SD2 and second gate driver GD2, and image processor IPU that outputs image data to first timing controller TCON1 and second timing controller TCON2. Display panel LCP1 displays a color image in first image display region DISP1 according to the input video signal, and display panel LCP2 displays a black-and-white image in second image display region DISP2 according to the input video signal. Image processor IPU receives input video signal Data transmitted from an external system (not illustrated), performs known image processing on input video signal Data, outputs first image data DAT1 to first timing controller TCON1, and outputs second image data DAT2 to second timing controller TCON2. Image processor IPU also outputs a control signal (not illustrated in FIG. 2) such as a synchronizing signal to first timing controller TCON1 and second timing controller TCON2. First image data DAT1 is image data for displaying the color image, and second image data DAT2 is image data for displaying the black-and-white image. Note that First image data DAT1 may be image data for displaying the black-and-white (monochrome) image, and second image data DAT2 may be image data for displaying the color image.

First Exemplary Embodiment

Figure 3:
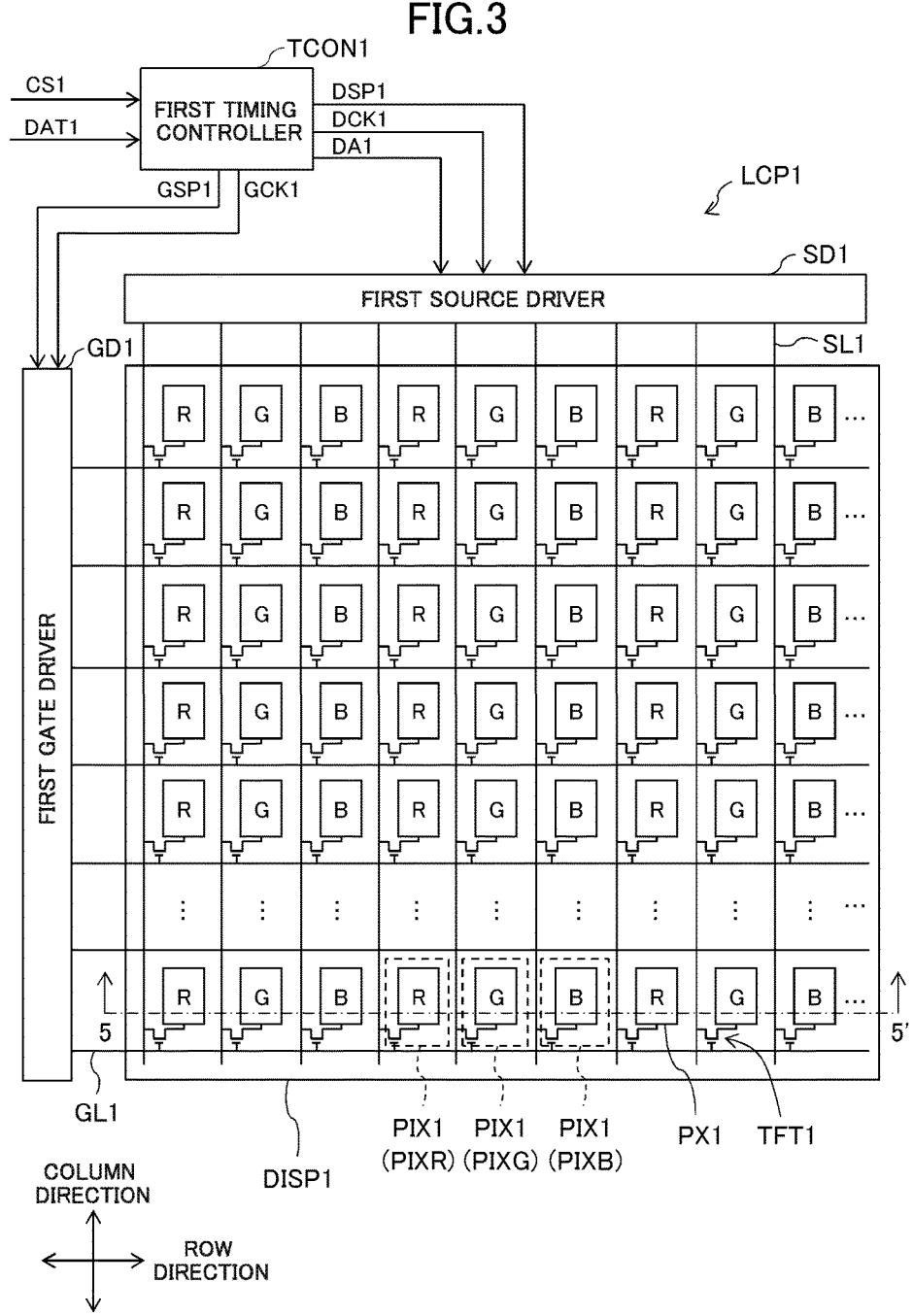
FIG. 3 is a plan view illustrating a schematic configuration of a front-side display panel according to the first exemplary embodiment.
Figure 4:
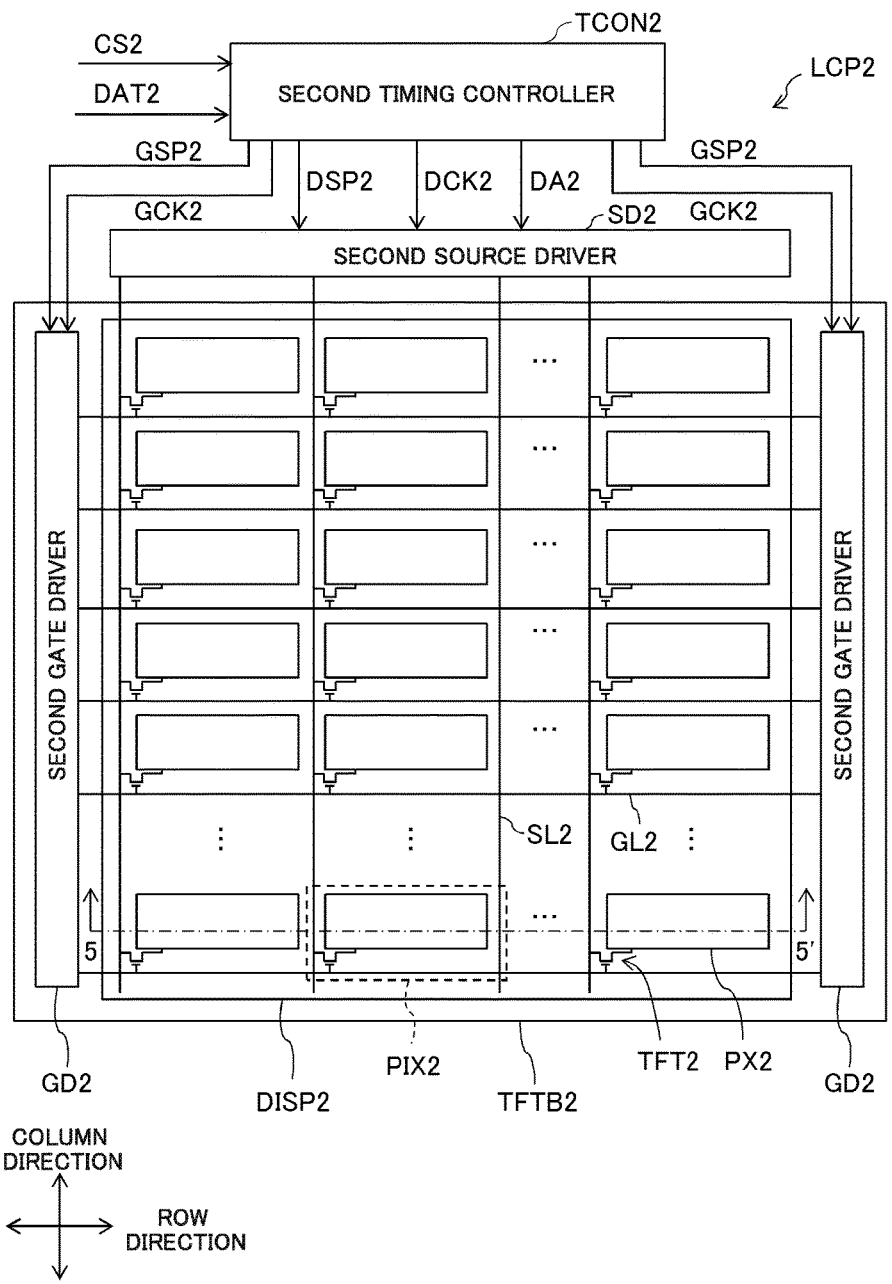
FIG. 4 is a plan view illustrating a schematic configuration of a rear-side display panel according to the first exemplary embodiment.
Figure 5:
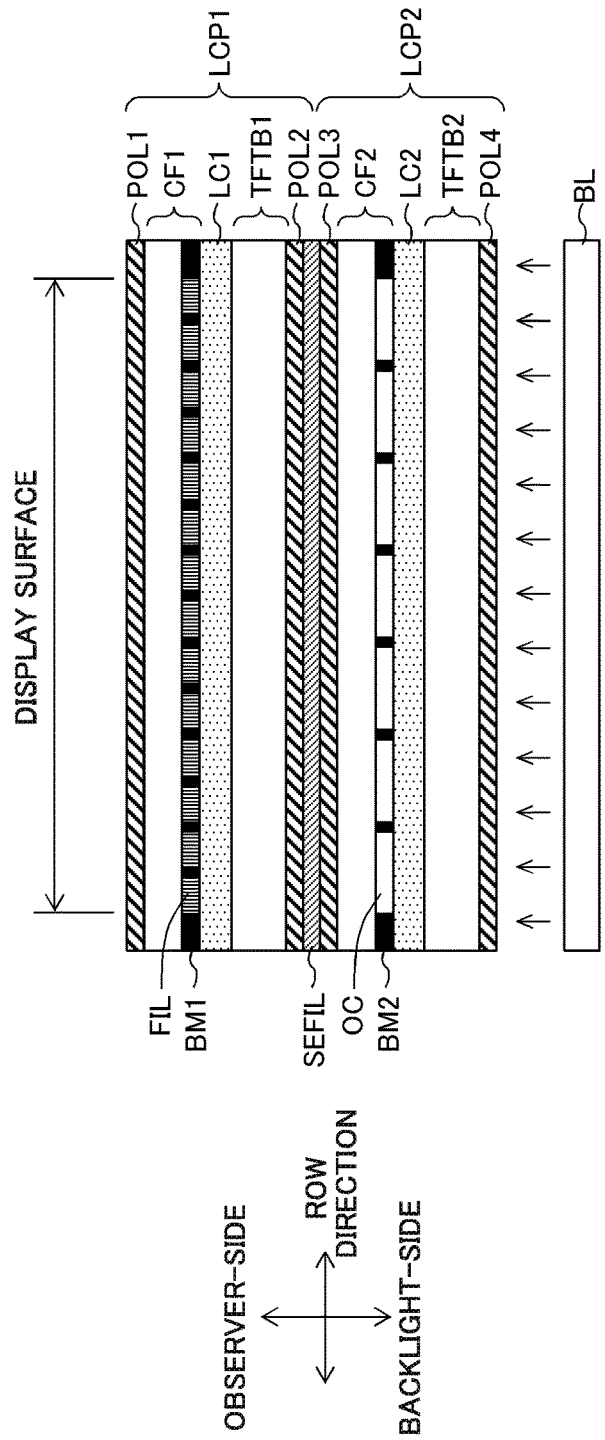
FIG. 5 is a sectional view taken along line V-V in FIGS. 3 and 4.

FIG. 3 is a plan view illustrating a schematic configuration of display panel LCP1 according to a first exemplary embodiment, and FIG. 4 is a plan view illustrating a schematic configuration of display panel LCP2 according to the first exemplary embodiment. FIG. 5 is a sectional view taken along line 5-5' in FIGS. 3 and 4.

The schematic configuration of display panel LCP1 will be described with reference to FIGS. 3 and 5. As illustrated in FIG. 5, display panel LCP1 includes thin film transistor substrate TFTB1 disposed on the side of backlight BL, opposing substrate CF1 which is disposed on the observer side while being opposite to thin film transistor substrate TFTB1, and liquid crystal layer LC1 disposed between thin film transistor substrate TFTB1 and opposing substrate CF1. Polarizing plate POL1 is disposed on the observer side. Polarizing plate POL2 is disposed on the side of display panel LCP1, which is close to backlight BL.

In thin film transistor substrate TFTB1, as illustrated in FIG. 3, a plurality of source lines SL1 extending in a first direction (for example, a column direction), and a plurality of gate lines GL1 extending in a second direction (for example, a row direction) different from the first direction are formed, and thin film transistor TFT1 is formed close to an intersection between each of the plurality of source lines SL1 and each of the plurality of gate lines GL1. In plan view of display panel LCP1, a region surrounded by two source lines SL1 adjacent to each other and two gate lines GL1 adjacent to each other is defined as one pixel PIX1, and a plurality of pixels PIX1 are disposed in a matrix form (the row direction and the column direction). The plurality of source lines SL1 are disposed at equal intervals in the row direction, and the plurality of gate lines GL1 are disposed at equal intervals in the column direction. In thin film transistor substrate TFFB1, pixel electrode PX1 is respectively formed in pixel PIX1, and one common electrode CT1 (see FIG. 9) common to the plurality of pixels PIX1 is formed. A source electrode constituting thin film transistor TFT1 is electrically connected to source line SL1, drain electrode DD1 (see FIG. 11) is electrically connected to pixel electrode PX1 through a contact hole CONT1, and a gate electrode is electrically connected to gate line GL1.

As illustrated in FIG. 5, light transparent sections that transmits lights and black matrix (light blocking section) BM1 blocking light transmission are formed on opposing substrate CF1, a plurality of color filter layers FIL (colored portions) are formed on opposing substrate CF1 in accordance with arrangements of pixel PIX1. Each color filter layer FIL is surrounded by black matrix BM1. For example, each color filter layer FIL is formed into a rectangular shape. The plurality of color filter layers FIL include red color filter layers FILR (red portion) made of a red (R color) material to transmit red light, green color filter layers FILG (green portion) made of a green (G color) material to transmit green light, and blue color filter layers FILB (blue portion) made of a blue (B color) material to transmit blue light. Red color filter layers FILR, green color filter layers FILG, and blue color filter layers FILB are repeatedly arrayed in the row direction in this order, identical-color filter layers FIL are arrayed in the column direction, and black matrix BM1 is formed at a boundary between color filter layers FIL adjacent to each other in the row direction and the column direction. In accordance with arrangements of color filter layers FIL, as illustrated in FIG. 3, the plurality of pixels PIX1 include red pixels PIXR corresponding to red color filter layers FILR, green pixels PIXG corresponding to green color filter layers FILG and blue pixels PIXB corresponding to blue color filter layers FILB. In first display panel LCP1, red pixels PIXR, green pixels PIXG, and blue pixels PIXB are repeatedly arrayed in the row direction in this order, and pixels PIX1 having the identical color are arrayed in the column direction.

First timing controller TCON1 has a known configuration. For example, based on first image data DAT1 and first control signal CS1 (such as a clock signal, a vertical synchronizing signal, and a horizontal synchronizing signal), which are output from image processor IPU, first timing controller TCON1 generates various timing signals (data start pulse DSP1, data clock DCK1, gate start pulse GSP1, and gate clock GCK1) to control first image data DA1 and drive of first source driver SD1 and first gate driver GD1 (see FIG. 3). First timing controller TCON1 outputs first image data DA1, data start pulse DSP1, and data clock DCK1 to first source driver SD1, and outputs gate start pulse GSP1 and gate clock GCK1 to first gate driver GD1.

First source driver SD1 outputs a data signal (data voltage) corresponding to first image data DA1 to source line SL1 based on data start pulse DSP1 and data clock DCK1. First gate driver GD1 outputs a gate signal (gate voltage) to gate lines GL1 based on gate start pulse GSP1 and gate clock GCK1.

First source driver SD1 supplies the data voltage to source line SL1, and first gate driver GD1 supplies the gate voltage to gate line GL1. Common voltage Vcom is supplied from a common driver (not illustrated) to common electrode CT1. When the gate voltage (gate-on voltage) is supplied to gate line GL1, thin film transistor TFT1 connected to said gate line GL1 is turned on, and the data voltage is supplied to pixel electrode PX1 through source line SL1 connected to said thin film transistor TFT1. An electric field is generated by a difference between the data voltage supplied to pixel electrode PX1 and common voltage Vcom supplied to common electrode CT1. The liquid crystal LCBP (see, FIG. 9) is driven by the electric field, and transmittance of the light emitted from backlight BL is controlled, thereby displaying an image. In display panel LCP1, a color image is displayed by the supply of desired data voltages to source line SL1 connected to pixel electrode PX1 of each of red pixel PIXR, green pixel PIXG, and blue pixel PIXB.

The schematic configuration of display panel LCP2 will be described with reference to FIGS. 4 and 5. As illustrated in FIG. 5, display panel LCP2 includes thin film transistor substrate TFTB2 disposed on the side of backlight BL, opposing substrate CF2, which is disposed on the observer side while being opposite to thin film transistor substrate TFTB2, and liquid crystal layer LC2 disposed between thin film transistor substrate TFTB2 and opposing substrate CF2. Polarizing plate POL4 is disposed on the side of display panel LCP2, which is close to backlight BL. Polarizing plate POL3 is disposed on the observer side of display panel LCP2. Adhesive layer SEFIL is disposed between polarizing plate POL2 of display panel LCP1 and polarizing plate POL3 of display panel LCP2.

In thin film transistor substrate TFTB2, as illustrated in FIG. 4, a plurality of source lines SL2 extending in the column direction, and a plurality of gate lines GL2 extending in the row direction are formed, and thin film transistor TFT2 is formed close to the intersection between each of the plurality of source lines SL2 and each of the plurality of gate lines GL2. In plan view of display panel LCP2, a region surrounded by two source lines SL2 adjacent to each other and two gate lines GL2 adjacent to each other is defined as one pixel PIX2, and a plurality of pixels PIX2 are disposed in a matrix form (the row direction and the column direction). The plurality of source lines SL2 are disposed at equal intervals in the row direction. The plurality of gate lines GL2 are disposed at equal intervals in the column direction. In thin film transistor substrate TFTB2, pixel electrode PX2 is formed in a corresponding pixel PIX2, and one common electrode CT2 (see FIG. 9) common to the plurality of pixels PIX2 is formed. A source electrode constituting thin film transistor TFT2 is electrically connected to source line SL2, drain electrode DD (see FIG. 11) is electrically connected to pixel electrode PX2 through a contact hole CONT2 (see FIG. 11), and a gate electrode is electrically connected to gate line GL2.

Second gate driver GD2 is incorporated in thin film transistor substrate TFTB2 so as to be disposed on both sides of second image display region DISP2. For example, one end (a left end in FIG. 4) of each gate line GL2 is connected to second gate driver GD2 disposed on a left of second image display region DISP2, and the other end (a right end in FIG. 4) of each gate line GL2 is connected to second gate driver GD2 disposed on a right of second image display region DISP2.

As illustrated in FIG. 5, a light transmission section that transmits light and black matrix BM2 (light shielding section) are formed in opposing substrate CF2. Black matrix BM2 is formed into an island shape so as to overlap thin film transistor TFT2 in planar view. A color filter layer is not formed in the light transmission section. For example, overcoat film OC is formed in the light transmission section.

Second timing controller TCON2 has a known configuration. For example, based on second image data DAT2 and second control signal CS2 (such as a clock signal, a vertical synchronizing signal, and a horizontal synchronizing signal), which are output from image processor IPU, second timing controller TCON2 generates various timing signals (data start pulse DSP2, data clock DCK2, gate start pulse GSP2, and gate clock GCK2) to control second image data DA2 and drive of second source driver SD2 and second gate driver GD2 (see FIG. 4). Second timing controller TCON2 outputs second image data DA2, data start pulse DSP2, and data clock DCK2 to second source driver SD2, and outputs gate start pulse GSP2 and gate clock GCK2 to second gate driver GD2.

Second source driver SD2 outputs the data voltage corresponding to second image data DA2 to source line SL2 based on data start pulse DSP2 and data clock DCK2. Second gate driver GD2 outputs the gate voltage to gate lines GL2 based on gate start pulse GSP2 and gate clock GCK2. The gate voltage is applied to gate lines GL2 at both sides.

Second source driver SD2 supplies the data voltage to each source line SL2, and second gate driver GD2 supplies the gate voltage to each gate line GL. The common driver supplies common voltage Vcom to common electrode CT2. When the gate voltage (gate-on voltage) is supplied to gate line GL2, thin film transistor TFT2 connected to said gate line GL2 is turned on, and the data voltage is supplied to pixel electrode PX2 through source line SL2 connected to said thin film transistor TFT2. An electric field is generated by a difference between the data voltage supplied to pixel electrode PX2 and common voltage Vcom supplied to common electrode CT2. The liquid crystal LCBN (see FIG. 9) is driven by the electric field, and transmittance of the light emitted from backlight BL is controlled, thereby displaying an image. A black-and-white image is displayed on display panel LCP2.

Liquid crystal display device LCD is configured such that a number of pixels PIX2 per unit area of display panel LCP2 is smaller than a number of pixels PIX1 per unit area of display panel LCP1. For example, liquid crystal display device LCD is configured such that a ratio of the number of pixels PIX1 per unit area of display panel LCP1 to the number of pixels PIX2 per unit area of display panel LCP2 is 3:1. Specifically, liquid crystal display device LCD is configured such that three pixels PIX1 (red pixel PIXR, green pixel PIXG, blue pixel PIXB) of display panel LCP1 and one pixel PIX2 of display panel LCP2 overlap each other in planar view.

Figure 6A:
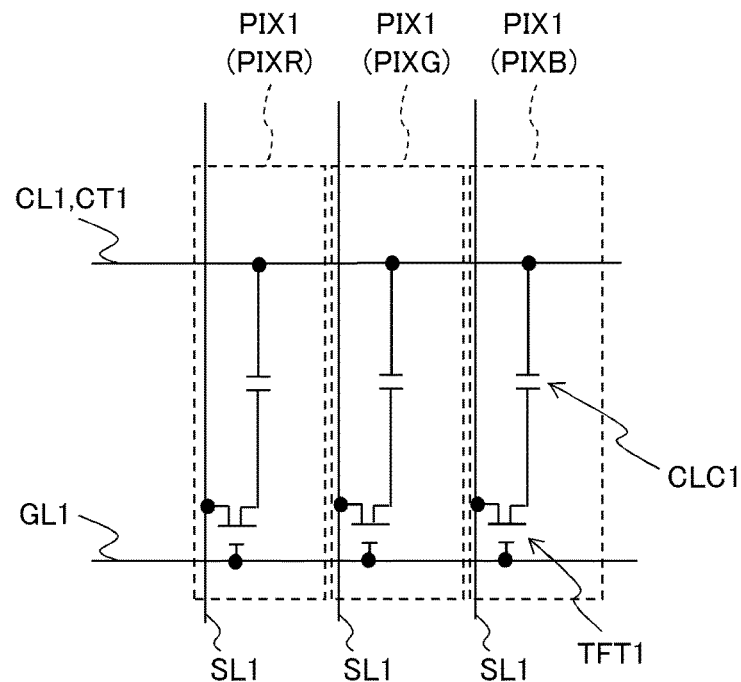
FIG. 6A is a plan view illustrating a relationship between pixels of the front-side display panel and pixels of the rear-side display panel.
Figure 6B:
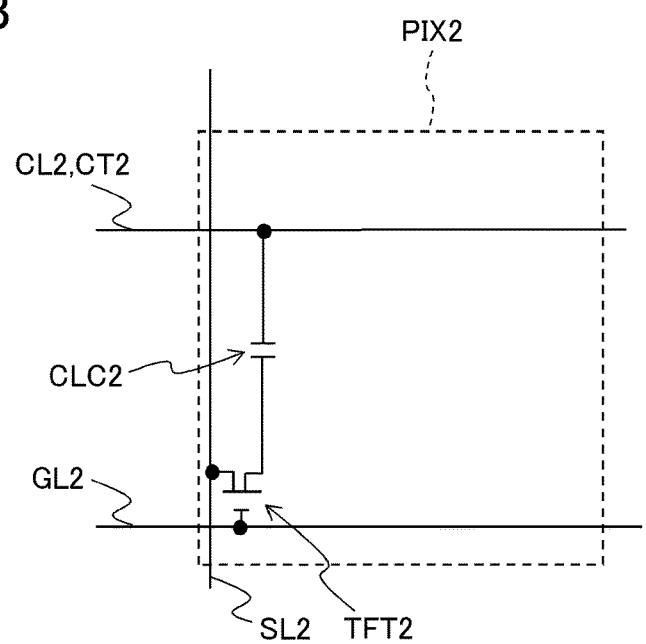
FIG. 6B is a plan view illustrating a relationship between pixels of the front-side display panel and pixels of the rear-side display panel.

FIG. 6 is a plan view illustrating a relationship between pixel PIX1 of display panel LCP1 and pixel PIX2 of display panel LCP2, which overlap each other. FIG. 7 is a plan view illustrating a specific configuration of pixel PIX1 in FIG. 6A, and FIG. 8 is a plan view illustrating a specific configuration of pixel PIX2 in FIG. 6B. FIG. 7B schematically illustrates operation of liquid crystal molecules LCBP, and FIGS. 8B and 8C schematically illustrate operation of liquid crystal molecules LCBN.

In the example of FIG. 6, one red pixel PIXR, one green pixel PIXG and one blue pixel PIXB of display panel LCP1 and one pixel PIX2 of display panel LCP2 overlap each other in planar view. In the case that areas (sizes) of pixels PIX1 of display panel LCP1 are equal to one another, an area of one pixel PIX2 of display panel LCP2 is three times the area of one pixel PIX1 of display panel LCP1. FIG. 6A illustrates common wiring CL1 connected to common electrode CT1 and liquid crystal capacitance CLC1, and FIG. 6B illustrates common wiring CL2 connected to common electrode CT2 and liquid crystal capacitance CLC2.

Figure 7A:
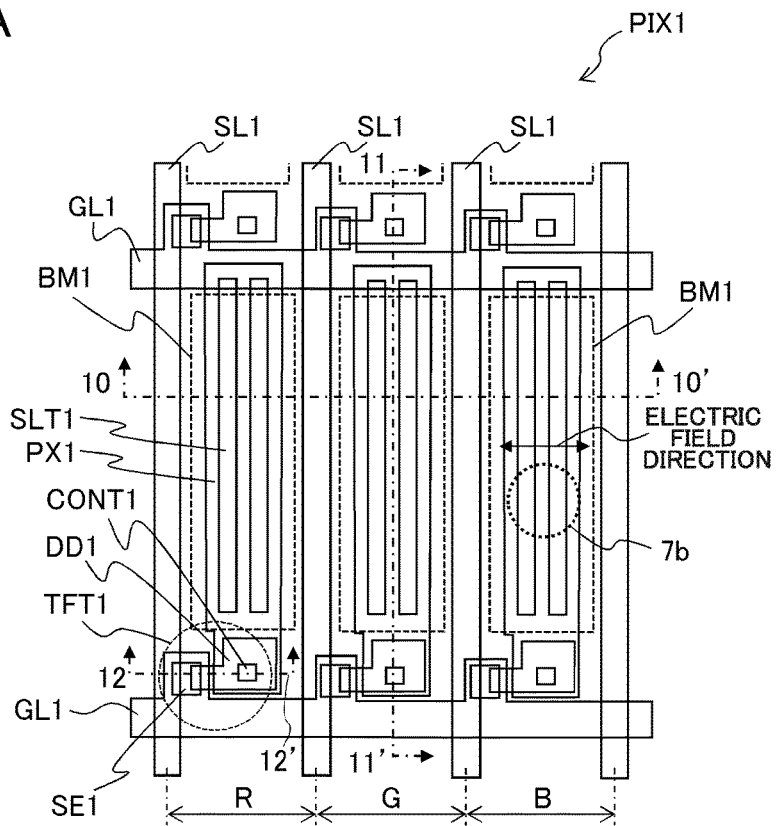
FIG. 7A is a plan view illustrating specific configurations of pixels of the front-side display panel according to the first exemplary embodiment.
Figure 7B:
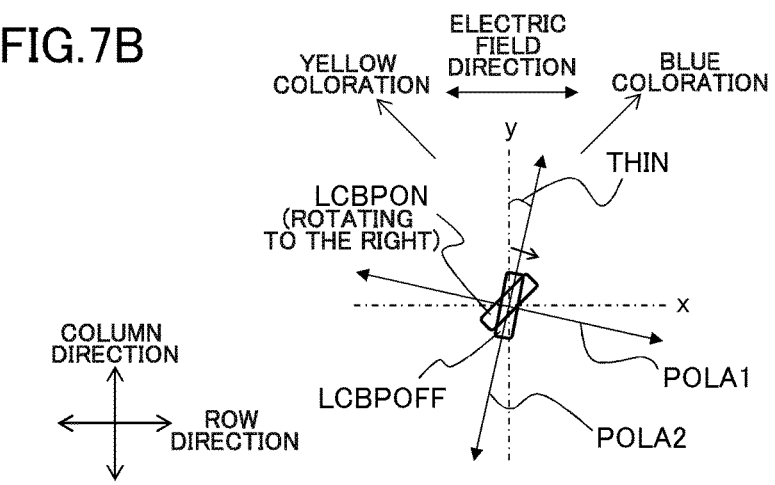
FIG. 7B is a plan view illustrating a movement of liquid crystal molecules in FIG. 7A.

As illustrated in FIG. 7, pixel electrode PX1 has a rectangular outer shape, and a plurality of slits SLT1 extending in the column direction are formed. FIG. 7B illustrates operation of liquid crystal molecules LCBP disposed in opening 7b of pixel PIX1 in FIG. 7A. Liquid crystal molecules LCBP included in liquid crystal layer LC1 of display panel LCP1 are positive type liquid crystal molecules. POLA1 indicates a polarizing axis of polarizing plate POL1, POLA2 indicates a polarizing axis of polarizing plate POL2. Polarizing axis POLA1 and polarizing axis POLA2 are orthogonal to each other. Polarizing axis POLA2 has predetermined angle THIN with respect to the column direction (Y-direction). An initial alignment direction (alignment axis) of liquid crystal molecules LCBP is set to the same direction as polarizing axis POLA2. With the above configuration, when an electric field (an electric field in an arrow direction of FIG. 7B) is applied to liquid crystal layer LC1, liquid crystal molecules LCBP rotate in an electric field direction (in this case, right rotation).

As illustrated in FIG. 8, pixel electrode PX2 has an outer shape of a substantial parallelogram, and a plurality of slits SLT2 extending in the column direction are formed. FIG. 9 is a plan view illustrating a configuration of pixel electrode PX2. As illustrated in FIG. 9, pixel electrode PX2 includes first edge L1 extending in the column direction, second edge L2 that is opposite to first edge L1 while extending in the column direction, third edge L3 connecting one ends of first edge L1 and second edge L2, and fourth edge L4 connecting the other ends of first edge L1 and second edge L2. Third edge L3 and fourth edge L4 are inclined while having a predetermined angle α with respect to the row direction and the column direction. In the case that liquid crystal molecules LCBN rotate in IPS type liquid crystal display device LCD, angle THIN is theoretically greater than or equal to 0 degree in order to decide that liquid crystal molecules LCBN rotate to the right or the left with respect to the electric field. Negative type liquid crystal molecules LCBN rotate in a direction perpendicular to the electric field direction. In consideration of a variation in manufacture, angle THIN is practically set in a range from 4 degrees to 10 degrees inclusive. Because transmittance decreases when angle THIN is large, a relatively small angle is used. On the other hand, because the rotation direction of liquid crystal molecules LCBN is decided by the electric field direction even in boundary 8c on gate line GL2, it is theoretically necessary that angle α be larger than angle THIN (α>THIN). For example, in the case that angle THING is set to 4 degrees, it is necessary that angle α be set to an angle larger than 4 degrees. However, in consideration of the variation in manufacture, angle α is preferably set greater than or equal to 8 degrees.

Figure 8A:
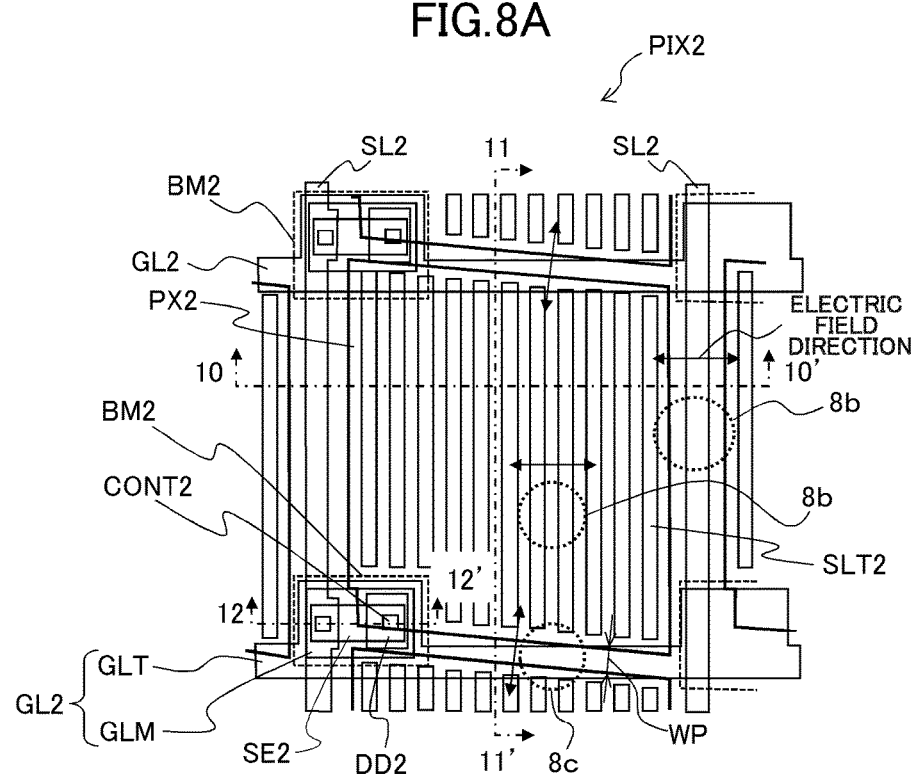
FIG. 8A is a plan view illustrating specific configurations of pixels of the rear-side display panel according to the first exemplary embodiment.
Figure 8B:
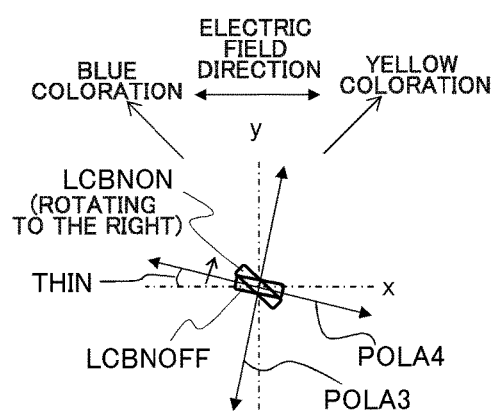
FIG. 8B is a plan view illustrating a movement of liquid crystal molecules in FIG. 8A.
Figure 8C:
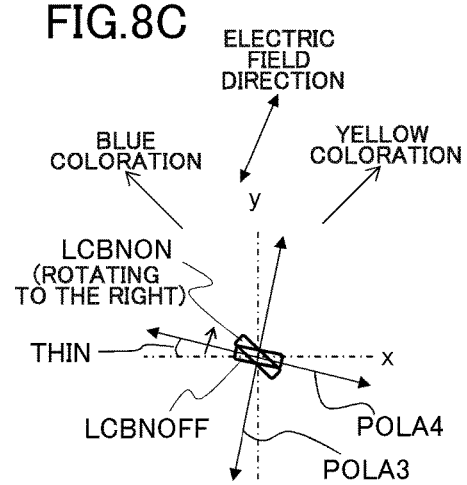
FIG. 8C is a plan view illustrating a movement of liquid crystal molecules in FIG. 8A.
Figure 9:
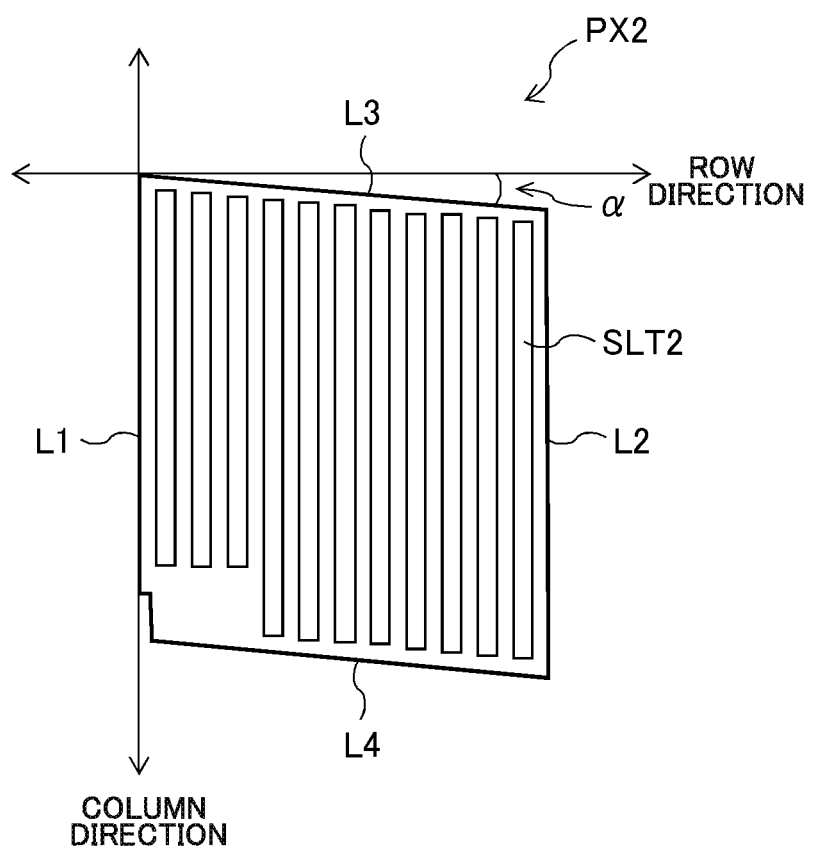
FIG. 9 is a plan view illustrating a pixel electrode of the rear-side display panel.

FIG. 8B illustrates operation of liquid crystal molecules LCBN disposed in opening 8b of pixel PIX2 in FIG. 8A. Liquid crystal molecules LCBN included in liquid crystal layer LC2 of display panel LCP2 are negative type liquid crystal molecules. POLA3 indicates a polarizing axis of polarizing plate POL3, POLA4 indicates a polarizing axis of polarizing plate POL4. Polarizing axis POLA3 and polarizing axis POLA4 are orthogonal to each other. Polarizing axis POLA4 has predetermined angle THIN with respect to the row direction (X-direction). An initial alignment direction (alignment axis) of liquid crystal molecules LCBN is set to the same direction as polarizing axis POLA4 With the above configuration, when the electric field (the electric field in the arrow direction of FIG. 8B) is applied to liquid crystal layer LC2, liquid crystal molecules LCBN rotate in the electric field direction (in this case, right rotation). Liquid crystal molecules LCBN disposed at boundary 8b of pixels PIX2 adjacent in the row direction rotate in the same direction as liquid crystal molecules LC BP disposed in opening 8b (right rotation).

FIG. 8C illustrates operation of liquid crystal molecules LCBN disposed at boundary 8c of pixels PIX2 adjacent in the column direction in FIG. 8A. Because third edge L3 and fourth edge L4 of pixel electrodes PX2 adjacent in the column direction have an inclined shape at boundary 8c (WP in FIG. 8A), the electric field (the electric field in the arrow direction of FIG. 8C) is generated in the direction inclined with respect to the column direction (Y-direction). Consequently, when the electric field is applied to liquid crystal layer LC2, liquid crystal molecules LCBN rotate in the electric field direction (right rotation).

Figure 10:
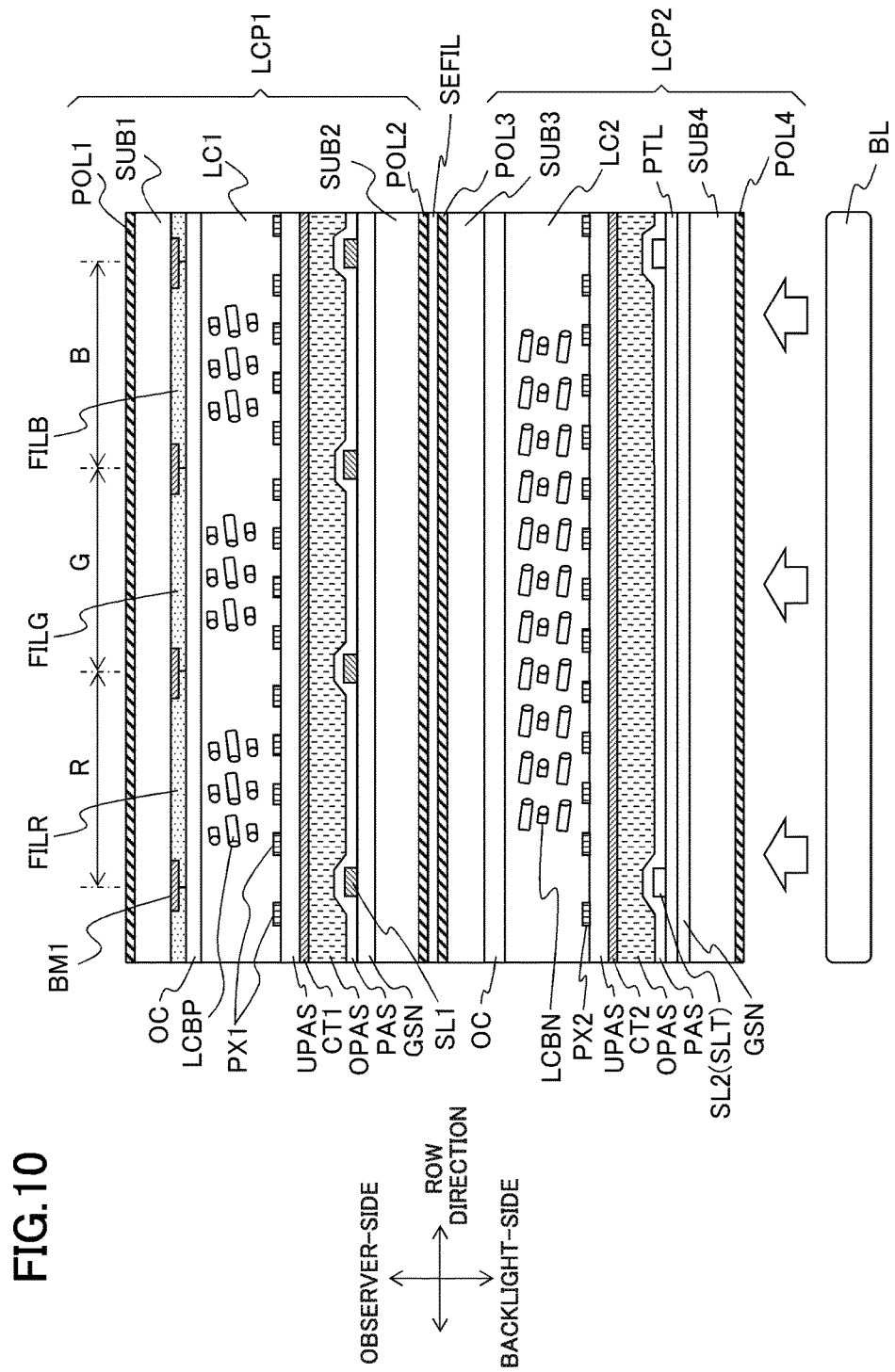
FIG. 10 is a sectional view taken along line X-X' in FIGS. 7A and 8A.

FIG. 10 is a sectional view taken along line 10-10' in FIGS. 8 and 9, FIG. 11 is a sectional view taken along line 11-11' in FIGS. 8 and 9, and FIG. 12 is a sectional view taken along line 12-12' in FIGS. 8 and 9. Sectional structures of pixels PIX1, PIX2 will be described below with reference to FIGS. 9 to 11.

In thin film transistor substrate TFTB1 (see FIG. 5) constituting pixel PIX1 of display panel LCP1, gate line GL1 is formed on transparent substrate SUB2 (glass substrate), and gate insulator GSN is formed so as to cover gate line GL1. Semiconductor layer SE1 made of amorphous silicon (a-Si), source line SL1 (source electrode), and drain electrode DD1 are formed on gate insulator GSN, and protective film PAS and organic insulator OPAS are formed so as to cover semiconductor layer SE1, source line SL1, and drain electrode DD1. Common electrode CT1 is formed on organic insulator OPAS, and protective film UPAS is formed so as to cover common electrode CT1. Pixel electrode PX1 is formed on protective film UPAS, and an alignment film (not illustrated) is formed so as to cover pixel electrode PX1. Contact hole CONT1 is made in protective film PAS, organic insulator OPAS, and protective film UPAS. A part of pixel electrode PX1 is electrically connected to drain electrode DD1 through contact hole CONT1. In counter substrate CF1 (see FIG. 5), black matrix BM1 and color filter FIL (red color filter FILR, green color filter FILG, and blue color filter FILB) are formed on transparent substrate SUB1 (glass substrate). Overcoat film OC is coated on a surface of color filter FIL, and an alignment film (not illustrated) is formed on overcoat film OC.

In thin film transistor substrate TFTB2 (see FIG. 5) constituting pixel PIX2 of display panel LCP2, gate line GL2 (hereinafter, referred to as gate line GLT) made of a light transmitting material is formed on transparent substrate SUB4 (glass substrate). For example, indium tin oxide (ITO) or indium zinc oxide (IZO) is used as the light transmitting material, which is a transparent electrode material. In a region constituting thin film transistor TFT2, gate electrode GLM made of a metallic material is formed on transparent gate line GLT. A metallic material mainly containing aluminum Al, molybdenum Mo, titanium Ti, or copper Cu is used as the metallic material. Gate insulator GSN is formed so as to cover transparent gate line GLT and gate electrode GLM. Semiconductor layer SE2 is formed on gate insulator GSN, and protective film PTL is formed so as to cover semiconductor layer SE2. For example, semiconductor layer SE2 is an oxide semiconductor containing indium (In), gallium (Ga), and zinc (Zn). Source line SL2 (hereinafter, referred to as transparent source line SLT) (source electrode) and drain electrode DD2 that are made of a light transmitting material are formed on protective film PTL, parts of source electrode and drain electrode DD2 are electrically connected to semiconductor layer SE2. Similarly to transparent gate line GLT, indium tin oxide (ITO) or indium zinc oxide (IZO) is used as the light transmitting material, which is the transparent electrode material. Protective film PAS and organic insulator OPAS are formed so as to cover transparent source line SLT (source electrode) and drain electrode DD2. Common electrode CT2 is formed on organic insulator OPAS, and protective film UPAS is formed so as to cover common electrode CT2. Pixel electrode PX2 is formed on protective film UPAS, and an alignment film (not illustrated) is formed so as to cover pixel electrode PX2. Contact hole CONT2 is made in protective film PAS, organic insulator OPAS, and protective film UPAS. A part of pixel electrode PX2 is electrically connected to drain electrode DD2 through contact hole CONT2. In counter substrate CF2 (see FIG. 5), black matrix BM2 is formed into an island shape on transparent substrate SUB3 (glass substrate) so as to cover a region where thin film transistor TFT2 is formed in planar view. Overcoat film OC is coated so as to cover black matrix BM2, and an alignment film (not illustrated) is formed on overcoat film OC.

According to the above configuration, source line SL2 and gate line GL2 are constructed with a transparent wiring that transmits the light in display panel LCP2. Black matrix BM2 is formed into an island shape. Because the light transmittance of display panel LCP2 can be increased, for example, it is difficult to visually recognize source line SL2, gate line GL2, and black matrix BM1 of display panel LCP2 when liquid crystal display device LCD is viewed obliquely.

Figure 13A:
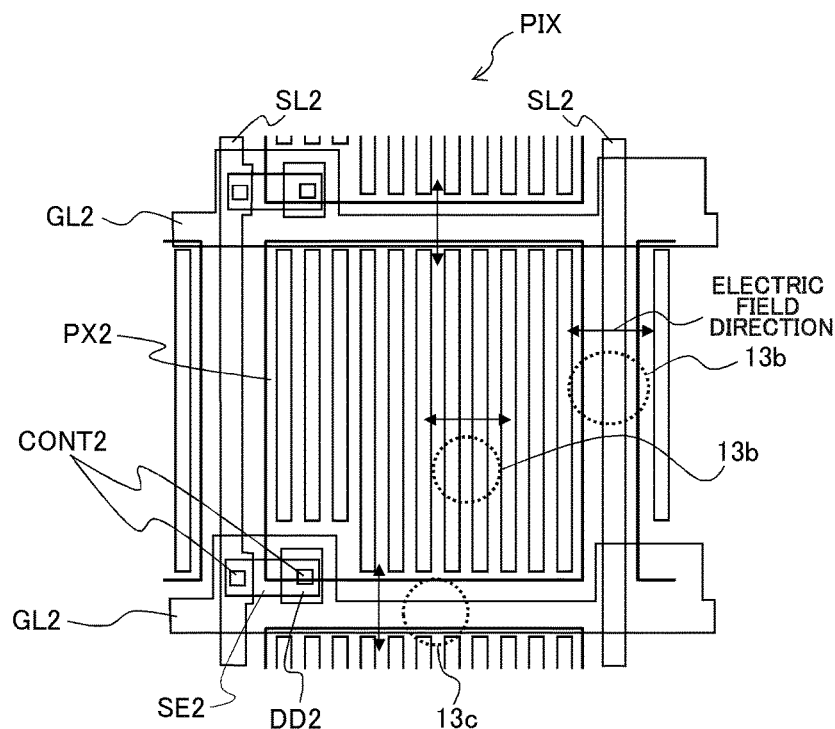
FIG. 13A is a plan view illustrating configurations of pixels of the rear-side display panel according to a comparative example.
Figure 13B:
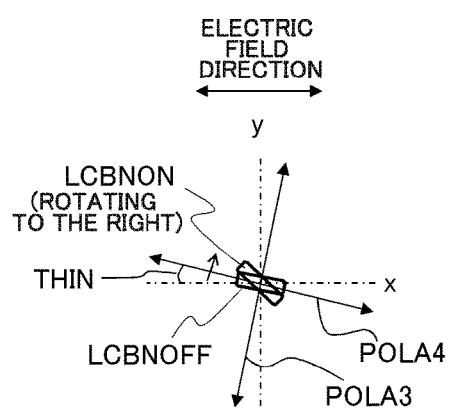
FIG. 13B is a plan view illustrating a movement of liquid crystal molecules in FIG. 13A.
Figure 13C:
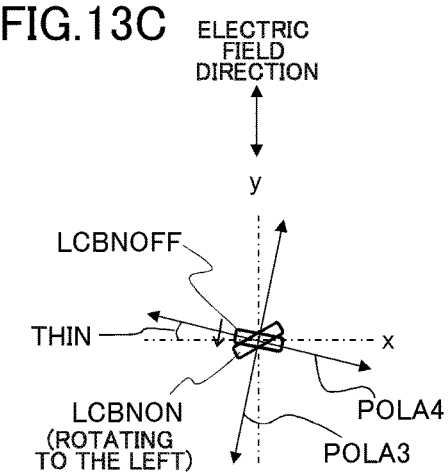
FIG. 13C is a plan view illustrating a movement of liquid crystal molecules in FIG. 13A.

With the above configuration, as illustrated in FIG. 8, liquid crystal molecules LCBN rotate in the same direction (in FIG. 8, right rotation) in whole second image display region DISP2 of display panel LCP2. On the other hand, in a liquid crystal display device according to a comparative example, the rotation direction (right rotation) of liquid crystal molecules LCBN disposed in opening 13b of the pixel and the rotation direction (left rotation) of liquid crystal molecules LCBN disposed near boundary 13c of the pixels adjacent in the column direction differ from each other in the rear-side display panel, as illustrated in FIG. 13. Consequently, at boundary 13c, liquid crystal molecules LCBN do not rotate, but the transmittance is degraded. Therefore, when the liquid crystal display device is obliquely viewed, boundary 13c of the rear-side display panel is easily seen as a dark line through the pixel opening of the front-side display panel, and the moire is easily visually recognized. In this respect, in liquid crystal display device LCD of the first exemplary embodiment, liquid crystal molecules LCBN disposed near boundary 8c (see FIG. 8C) of pixel PIX2 rotate in the same direction (right rotation) as the rotation direction of liquid crystal molecules LCBN disposed in opening 8b (see FIG. 8C) of pixel PIX2, so that the dark line is not generated and the light can be transmitted through whole second image display region DISP2.

Additionally, in liquid crystal display device LCD of the first exemplary embodiment, a longitudinal axis (major axis) direction of liquid crystal molecules LCBP of display panel LCP1 and a longitudinal axis (major axis) direction of liquid crystal molecules LCBN of display panel LCP2 differ from each other by 90 degrees as illustrated in FIGS. 7 and 8, so that coloration (yellow, blue) can be canceled when display panel LCP1 and display panel LCP2 which are overlapped with each other, are viewed from the oblique direction.

Thus, according to liquid crystal display device LCD of the first exemplary embodiment, the moire caused by the black matrix of display panel LCP2, the wiring (source line, gate line), and the dark line of the pixel boundary can be reduced, and the moire (color moire) caused by the coloring can also be reduced.

In a structure in which display panel LCP1 and display panel LCP2 are bonded by adhesive layer SEFIL, the distance (thickness) between black matrix BM1 of display panel LCP1 and black matrix BM2 of display panel LCP2 or the wiring increases from 0.4 mm to 1.5 mm, and the moire is easily caused by the parallax. As to a method for reducing the moire, as described in WO2007/040127, the light transmitted through display panel LCP2 is tentatively scattered by laminating adhesive layers SEFIL and a plurality of diffusion sheets. However, in the case that the plurality of diffusion sheets are used, there arises a problem that the transmittance is degraded because the polarized light transmitted through display panel LCP2 is partially scattered, the display device is thickened due to a thickness of the diffusion sheet (100 μm per sheet), or cost increases by addition of the diffusion sheet. On the other hand, according to liquid crystal display device LCD of the first exemplary embodiment, the diffusion sheet can be reduced or eliminated while the moire is reduced. Consequently, the reduction of the moire can simultaneously achieve improvement of the transmittance, thinning, and cost reduction.

Figure 14:
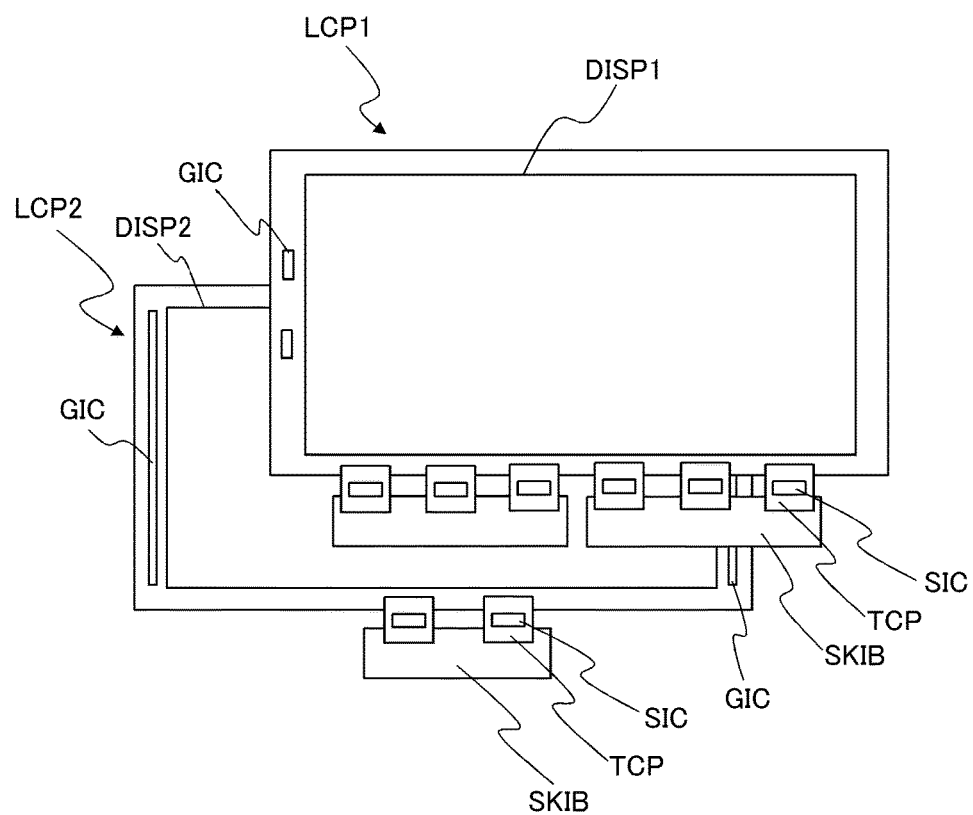
FIG. 14 is a view illustrating configurations of drivers of the front-side display panel and the rear-side second display panel according to the first exemplary embodiment.

FIG. 14 is a view illustrating configurations of drivers of display panel LCP1 and display panel LCP2. Six source driver ICs (SIC) and two gate driver ICs (GIC) are mounted on display panel LCP1. Two source driver ICs (SIC) are mounted on display panel LCP2, and two gate driver ICs (GIC) are mounted on both sides of second image display region DISP2. In the case that gate line GL2 is made of a transparent electrode material, the wiring resistance increases, and the degradation of electric feeding efficiency of the gate voltage or the signal delay may be generated. In this respect, in display panel LCP2, second gate drivers GD2 are disposed on both sides of gate line GL2 and the gate voltage is supplied from both sides of gate line GL2, so that the degradation of the electric feeding efficiency of the gate voltage or the signal delay can be prevented. Second gate driver GD2 is incorporated in thin film transistor substrate TFTB2, so that cost increase caused by providing second gate drivers GD2 on both sides can be prevented.

Any material transmitting the light can be used as transparent source line SLT and transparent gate line GLT, and there is no particular limitation on the light transmittance. For example, transparent source line SLT and transparent gate line GLT may be a single-layer wiring made of silver (Ag) or a laminated wiring of ITO and silver (Ag) formed on ITO.

Preferably, ITO used for transparent source line SLT and transparent gate line GLT is polycrystalline ITO formed by heating film deposition using sputtering in order to achieve a low resistance.

Second Exemplary Embodiment

A second exemplary embodiment of the present disclosure will be described below with reference to the drawings. For convenience, the same component as that of the first exemplary embodiment is designated by the same numeral, and the description will be omitted. In the second exemplary embodiment, the term defined in the first exemplary embodiment is used according to the definition of the first exemplary embodiment unless otherwise noted. The same holds true for the following exemplary embodiments.

Figure 15:
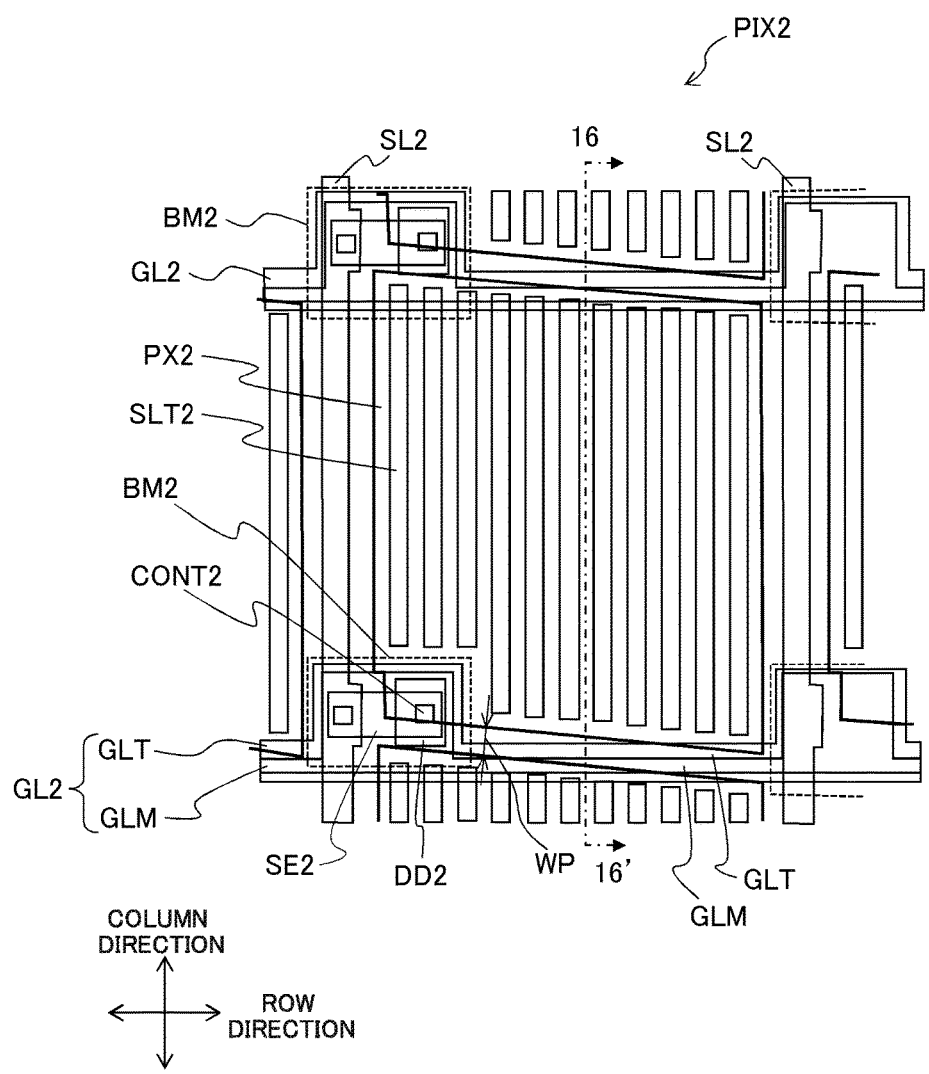
FIG. 15 is a plan view illustrating specific configurations of pixels of the rear-side display panel according to a second exemplary embodiment.
Figure 16:
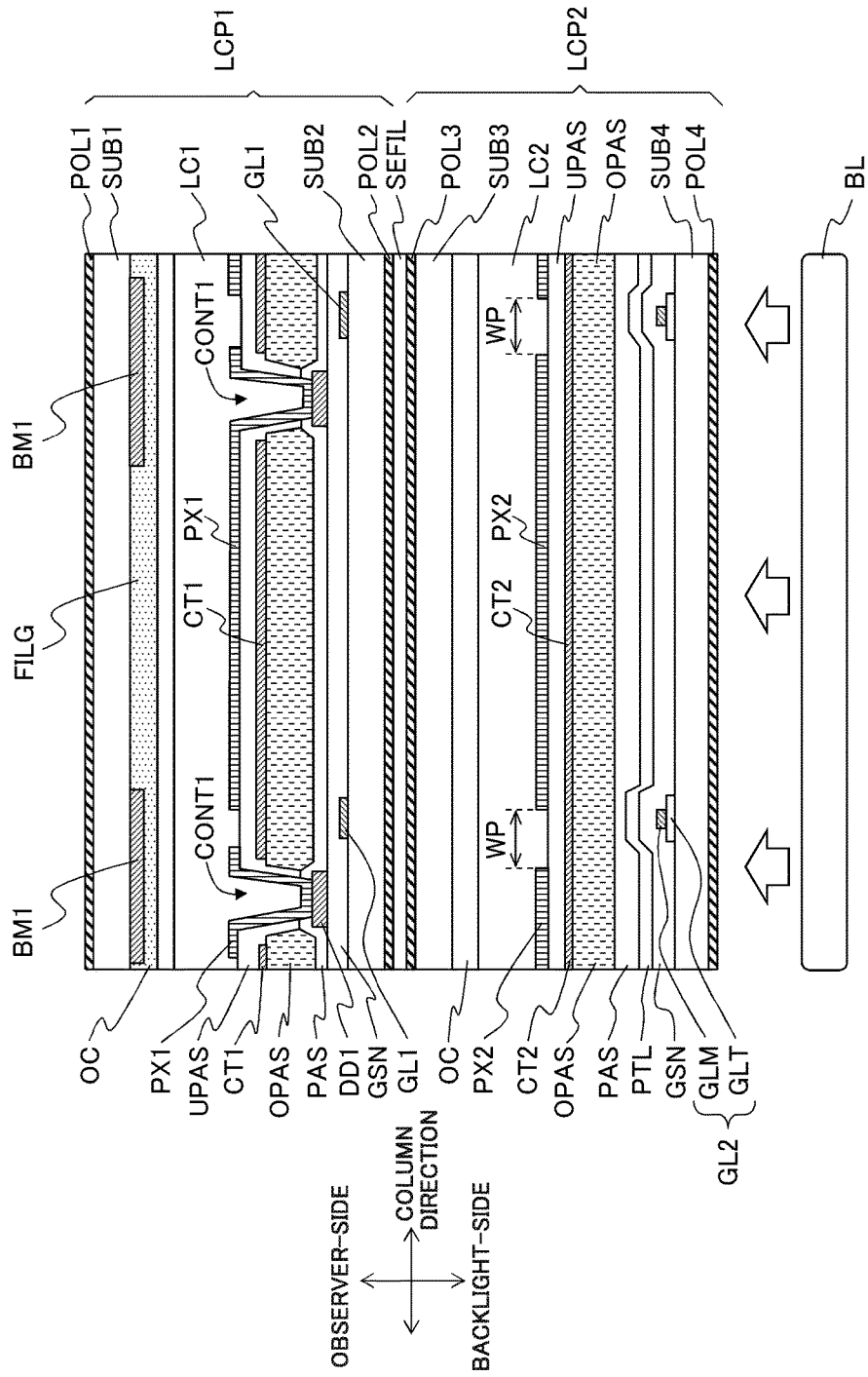
FIG. 16 is a sectional view taken along line XVI-XVI' in FIG. 15.

FIG. 15 is a plan view illustrating a specific configuration of pixel PIX2 of display panel LCP2 in liquid crystal display device LCD of the second exemplary embodiment. Display panel LCP2 of the second exemplary embodiment is similar to display panel LCP2 of the first exemplary embodiment, except for the configuration of gate line GL2. In the second exemplary embodiment, gate line GL2 is formed by laminating transparent gate line GLT made of a transparent electrode material (for example, ITO) and metallic gate line GLM made of a metallic material. FIG. 16 is a sectional view taken along line 16-16' in FIG. 15. As illustrated in FIG. 16, transparent gate line GLT is formed on transparent substrate SUB4, and metallic gate line GLM is formed on transparent gate line GLT. A length in the column direction of metallic gate line GLM is narrower than a length in the column direction of transparent gate line GLT, and is narrower than a length in the column direction of a part of gate line GL1 which part is overlapping metallic gate line GLM in planar view. The length in the column direction of metallic gate line GLM is also narrower than a length in the column direction of a part of black matrix BM1 which part is overlapping metallic gate line GLM in planar view. For example, the length in the column direction of metallic gate line GLM ⅓ of the length in the column direction of black matrix BM1. Other configurations are similar to those of liquid crystal display device LCD of the first exemplary embodiment.

According to the configuration of the second exemplary embodiment, gate line GL2 includes metallic gate line GLM, so that the degradation of the electric feeding efficiency of the gate voltage or the signal delay can be prevented. The appearance of moire can be suppressed by setting the width of metallic gate line GLM to an extent in which metallic gate line GLM is hardly visually recognized when liquid crystal display device LCD is obliquely viewed.

Third Exemplary Embodiment

Figure 17:
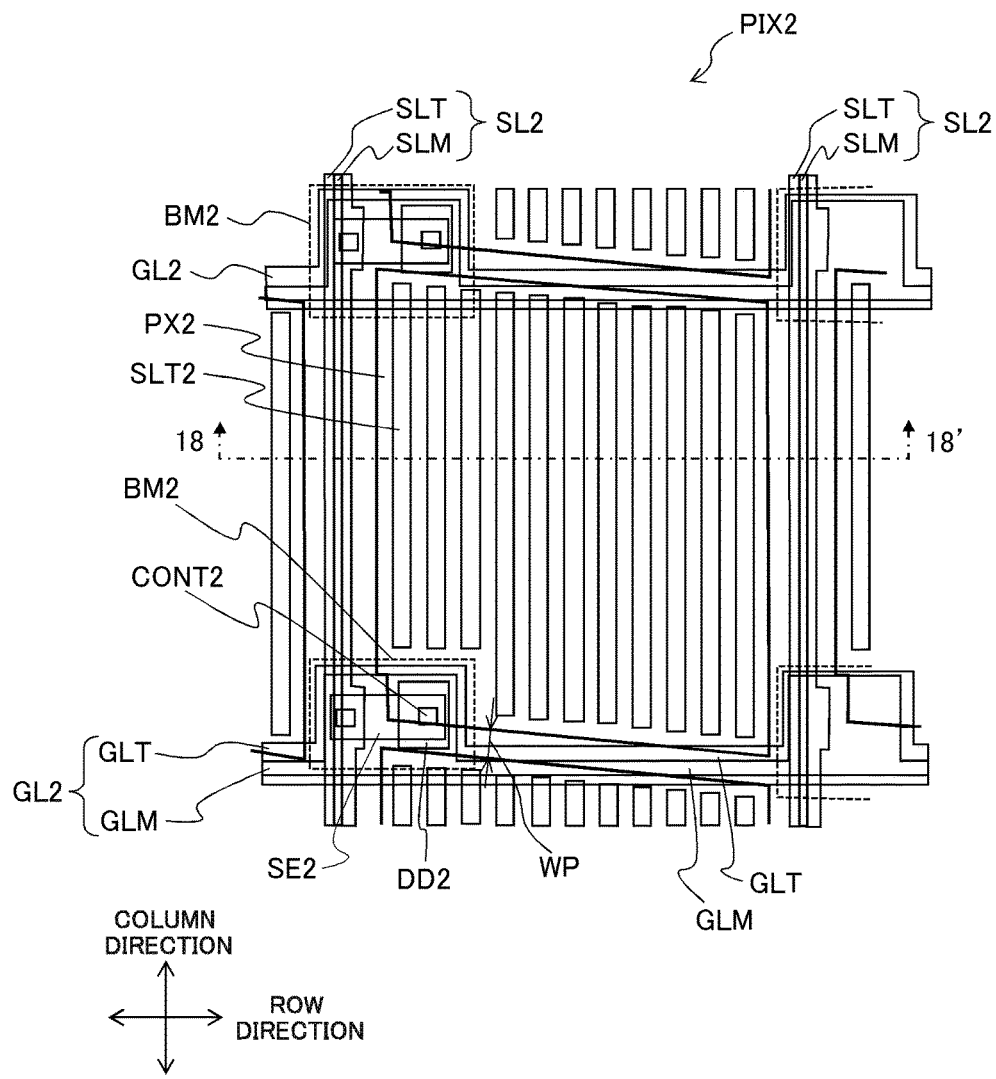
FIG. 17 is a plan view illustrating specific configurations of pixels of the rear-side display panel according to a third exemplary embodiment.
Figure 18:
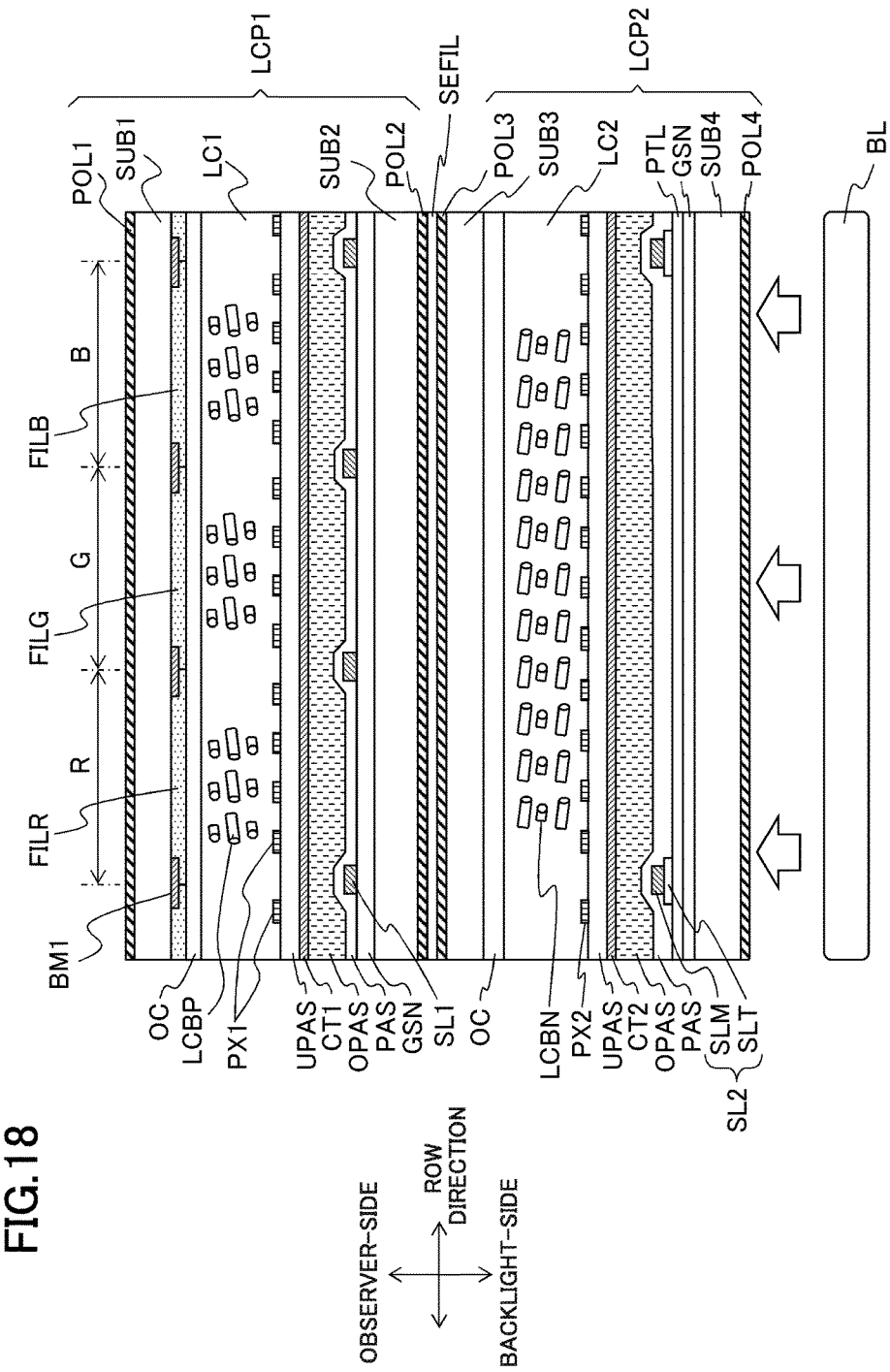
FIG. 18 is a sectional view taken along line XVII-XVII' in FIG. 17.

FIG. 17 is a plan view illustrating a specific configuration of pixel PIX2 of display panel LCP2 of liquid crystal display device LCD according to a third exemplary embodiment. In display panel LCP2 of the second exemplary embodiment, gate line GL2 is formed by laminating transparent gate line GLT made of the transparent electrode material and metallic gate line GLM made of the metallic material. On the other hand, in display panel LCP2 of the third exemplary embodiment, additionally, source line SL2 is also formed by laminating transparent source line SLT made of the transparent electrode material (for example, ITO) and metallic source line SLM made of the metallic material. FIG. 18 is a sectional view taken along line 18-18' in FIG. 17. As illustrated in FIG. 18, transparent source line SLT is formed on gate insulator GSN, and metallic source line SLM is formed on transparent source line SLT. A length in the row direction of metallic source line SLM is narrower than a length in the row direction of transparent source line SLT, and is narrower than a length in the row direction of a part of source line SL1, which part overlaps metallic source line SLM in planar view. The length in the row direction of metallic source line SLM is also narrower than a length in the row direction of a part of black matrix BM1, which part overlaps metallic source line SLM in planar view. For example, the length in the row direction of metallic source line SLM is ⅓ of the length in the row direction of black matrix BM1. Other configurations are similar to those of liquid crystal display device LCD of the first exemplary embodiment.

According to the configuration of the third exemplary embodiment, source line SL2 includes metallic source line SLM, so that the delay of a data signal can be prevented. The appearance of moire can be suppressed by setting the width of metallic source line SLM to an extent in which metallic source line SLM is hardly visually recognized when liquid crystal display device LCD is obliquely viewed.

Fourth Exemplary Embodiment

Figure 19:
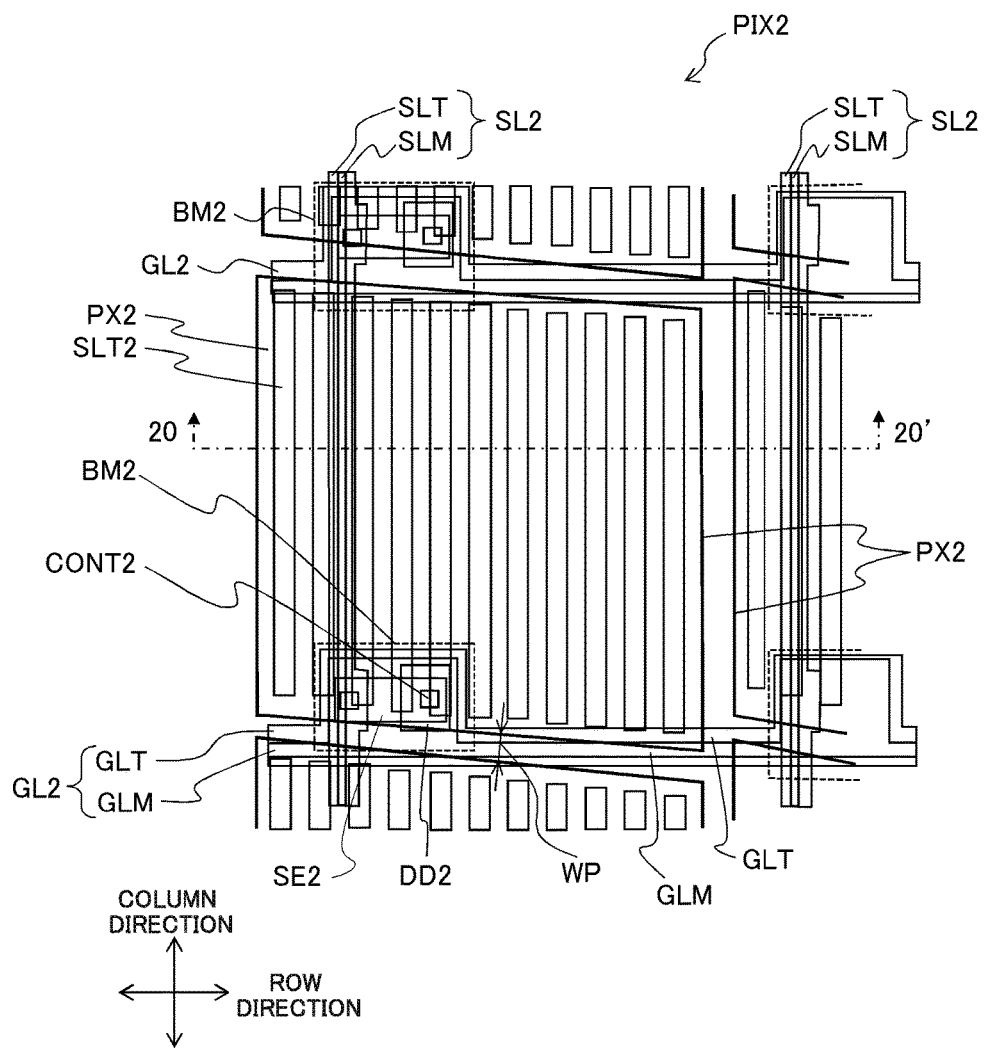
FIG. 19 is a plan view illustrating specific configurations of pixels of the rear-side display panel according to a fourth exemplary embodiment.
Figure 20:
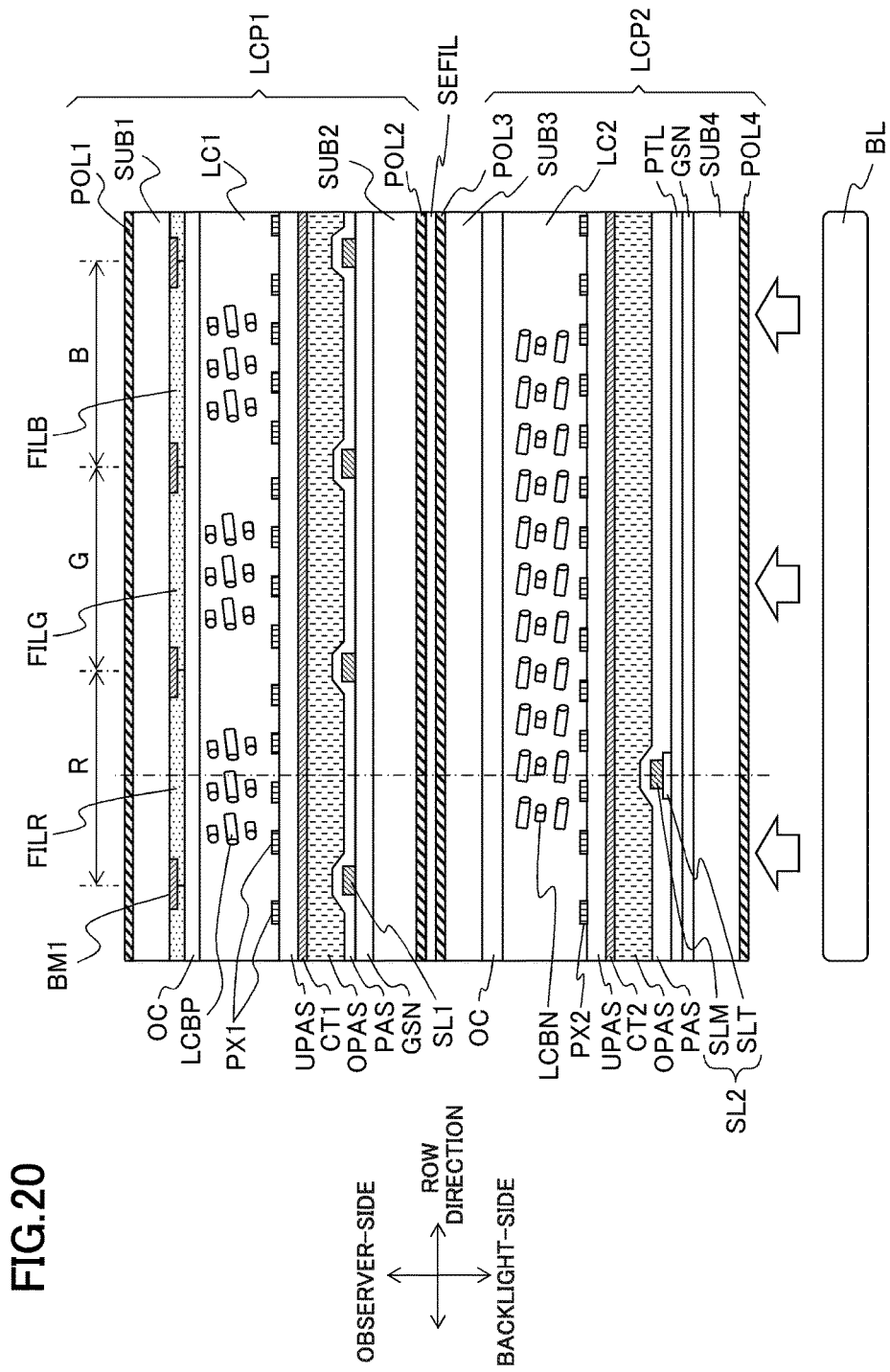
FIG. 20 is a sectional view taken along line XX-XX' in FIG. 19.

FIG. 19 is a plan view illustrating a specific configuration of pixel PIX2 of display panel LCP2 of liquid crystal display device LCD according to a fourth exemplary embodiment. FIG. 20 is a sectional view taken along line 20-20' in FIG. 19. In display panel LCP2 of the fourth exemplary embodiment, gate line GL2 and source line SL2 are formed by the transparent wiring made of the transparent electrode material and the metallic wiring made of the metallic material, similarly to the configuration of the third exemplary embodiment. In display panel LCP2 of the fourth exemplary embodiment, source line SL2 is disposed so as to be located near the center in the row direction of pixel PIX1 of display panel LCP1 in planar view. In the example of FIG. 20, source line SL2 is disposed so as to be located near the center of red pixel PIXR in planar view. Preferably, source line SL2 is disposed so as to be located near the center of red pixel PIXR or blue pixel PIXB because red pixel PIXR or blue pixel PIXB has low luminous sensitivity.

According to the configuration of the fourth exemplary embodiment, because metallic source line SLM of source line SL2 is visually recognized when liquid crystal display device LCD is seen from the front and is seen obliquely, an opening ratio of the pixel does not change depending on a viewing angle. Consequently, periodical light and shade of the luminance is hardly generated, so that the appearance of moire can be prevented.

The configuration of the fourth exemplary embodiment suitable for a liquid crystal display device having a large pixel size. Gate line GL2 may be disposed similarly to source line SL2. Specifically, gate line GL2 may be disposed so as to be located near the center in the column direction of pixel PIX1 of display panel LCP1 in planar view. Thus, the moire can be reduced in the horizontal direction and the vertical direction.

Fifth Exemplary Embodiment

Figure 21:
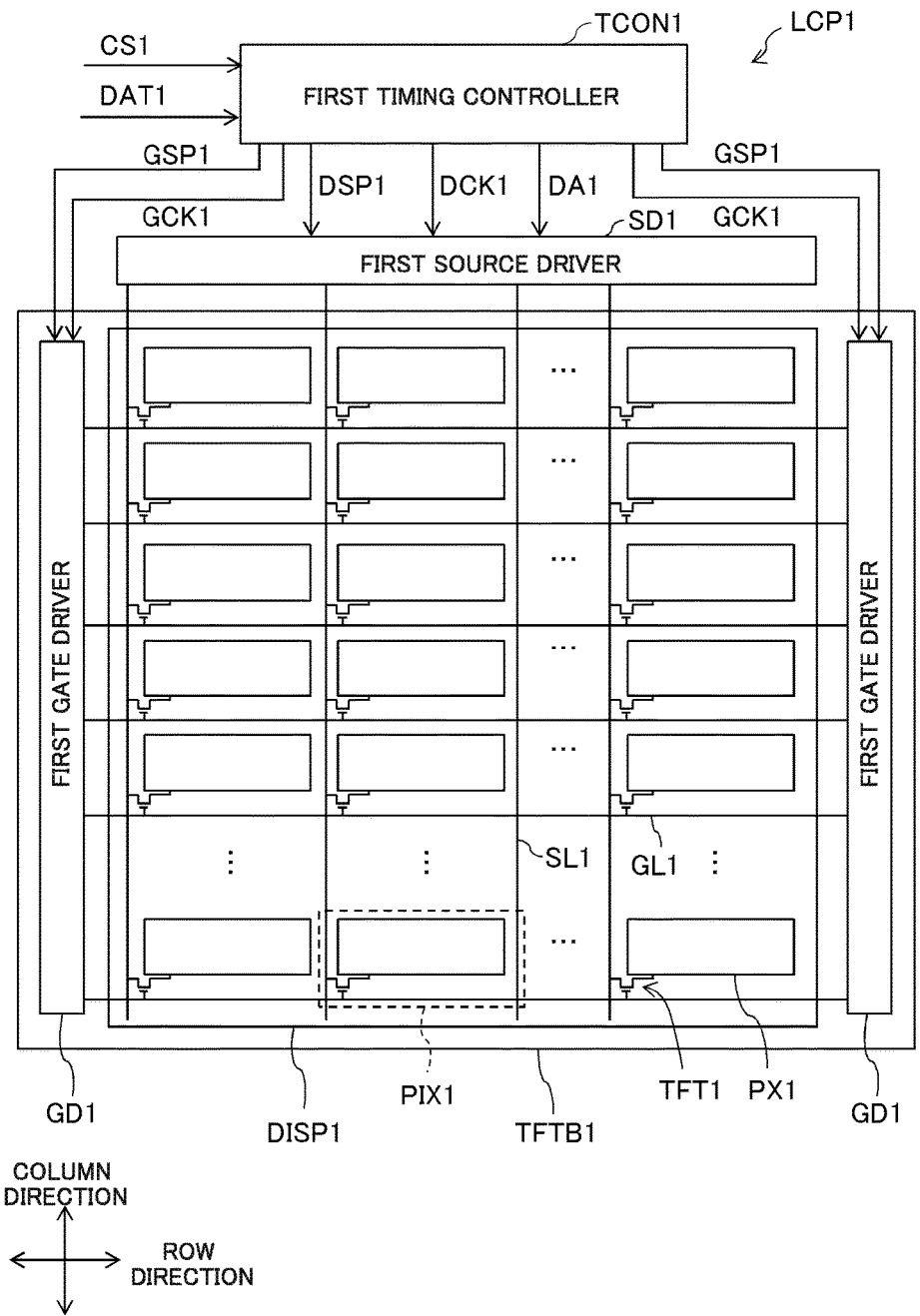
FIG. 21 is a plan view illustrating a schematic configuration of a front-side first display panel according to a fifth exemplary embodiment.
Figure 22:
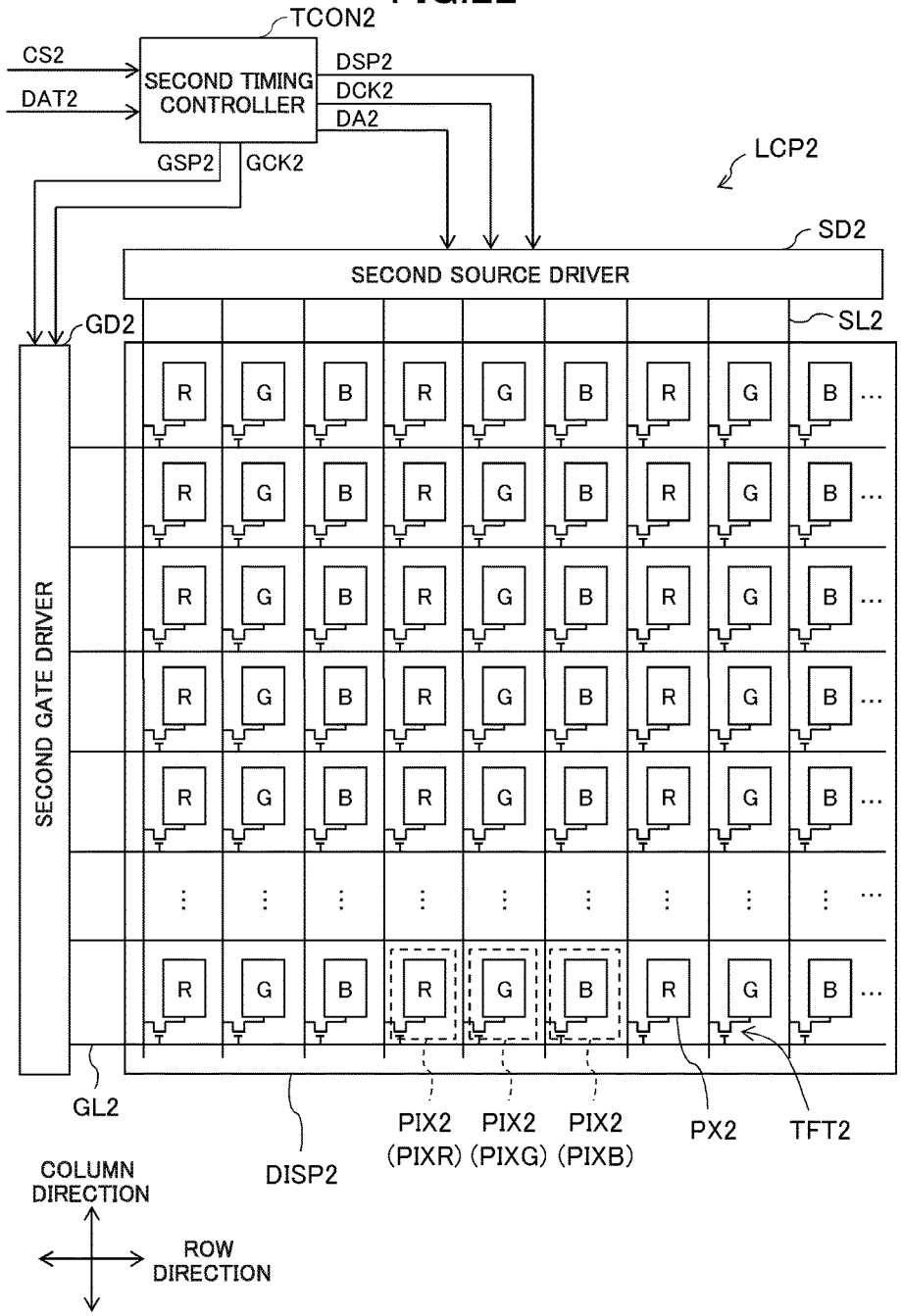
FIG. 22 is a plan view illustrating a schematic configuration of a rear-side display panel according to the fifth exemplary embodiment.

FIG. 21 is a plan view illustrating a schematic configuration of display panel LCP1 according to a fifth exemplary embodiment, and FIG. 22 is a plan view illustrating a schematic configuration of display panel LCP2 according to the fifth exemplary embodiment. In liquid crystal display device LCD of the fifth exemplary embodiment, schematically display panel LCP1 includes the configuration of display panel LCP2 of the first exemplary embodiment, and display panel LCP2 includes the configuration of display panel LCP1 of the first exemplary embodiment.

Figure 23:
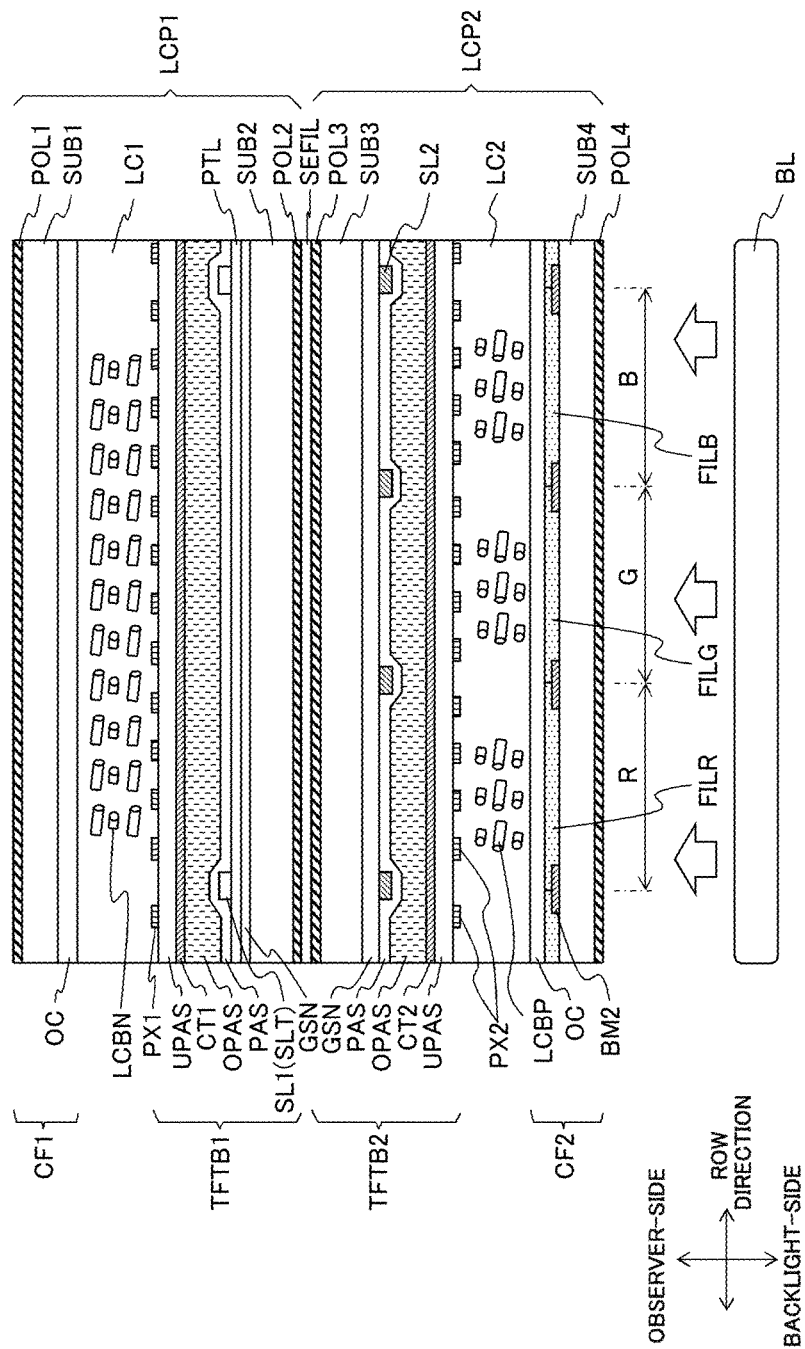
FIG. 23 is a sectional view of pixels according to the fifth exemplary embodiment, which is taken along with the row direction.
Figure 24:
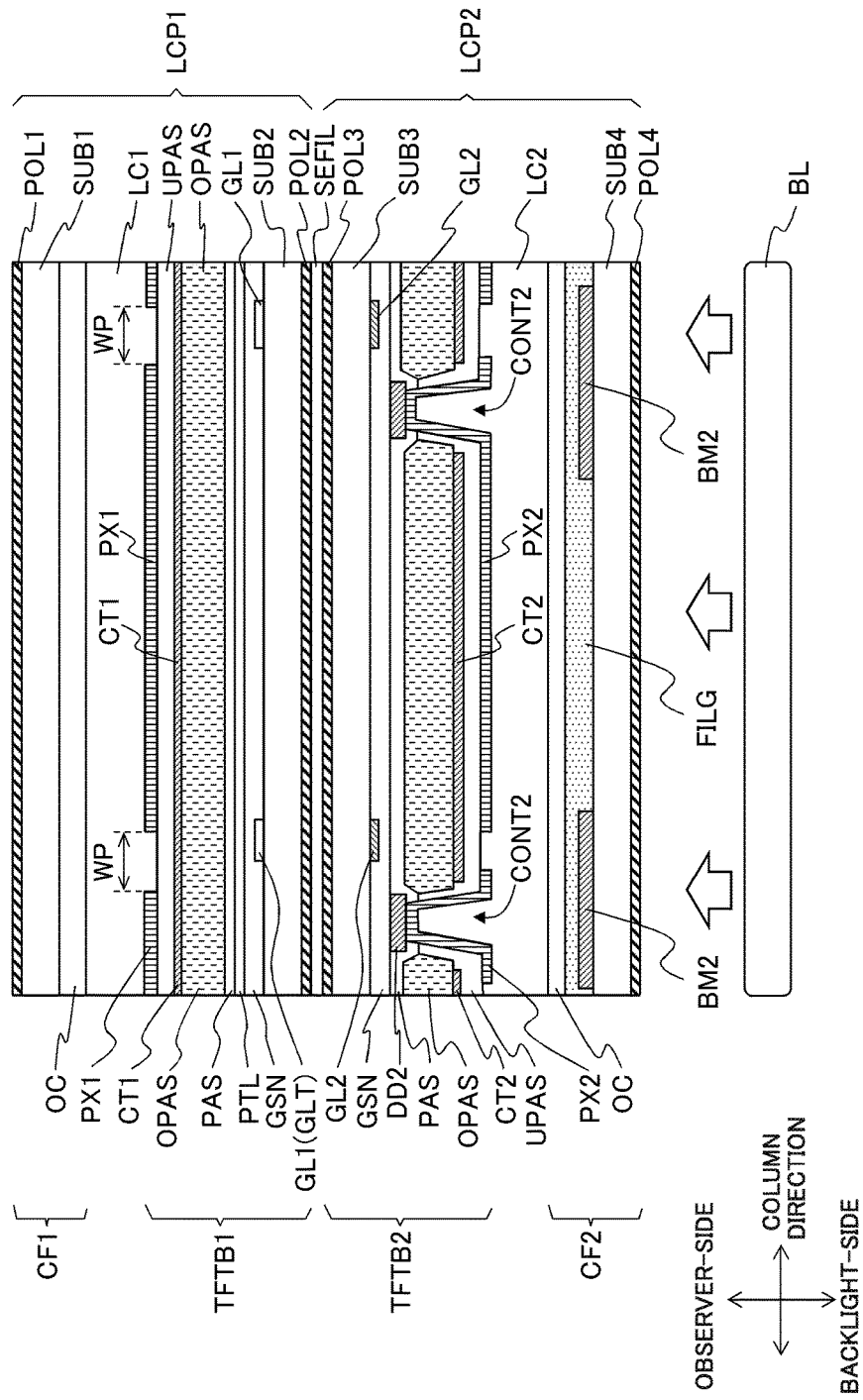
FIG. 24 is a sectional view of pixels according to the fifth exemplary embodiment, which is taken along with the column direction.
Figure 25:
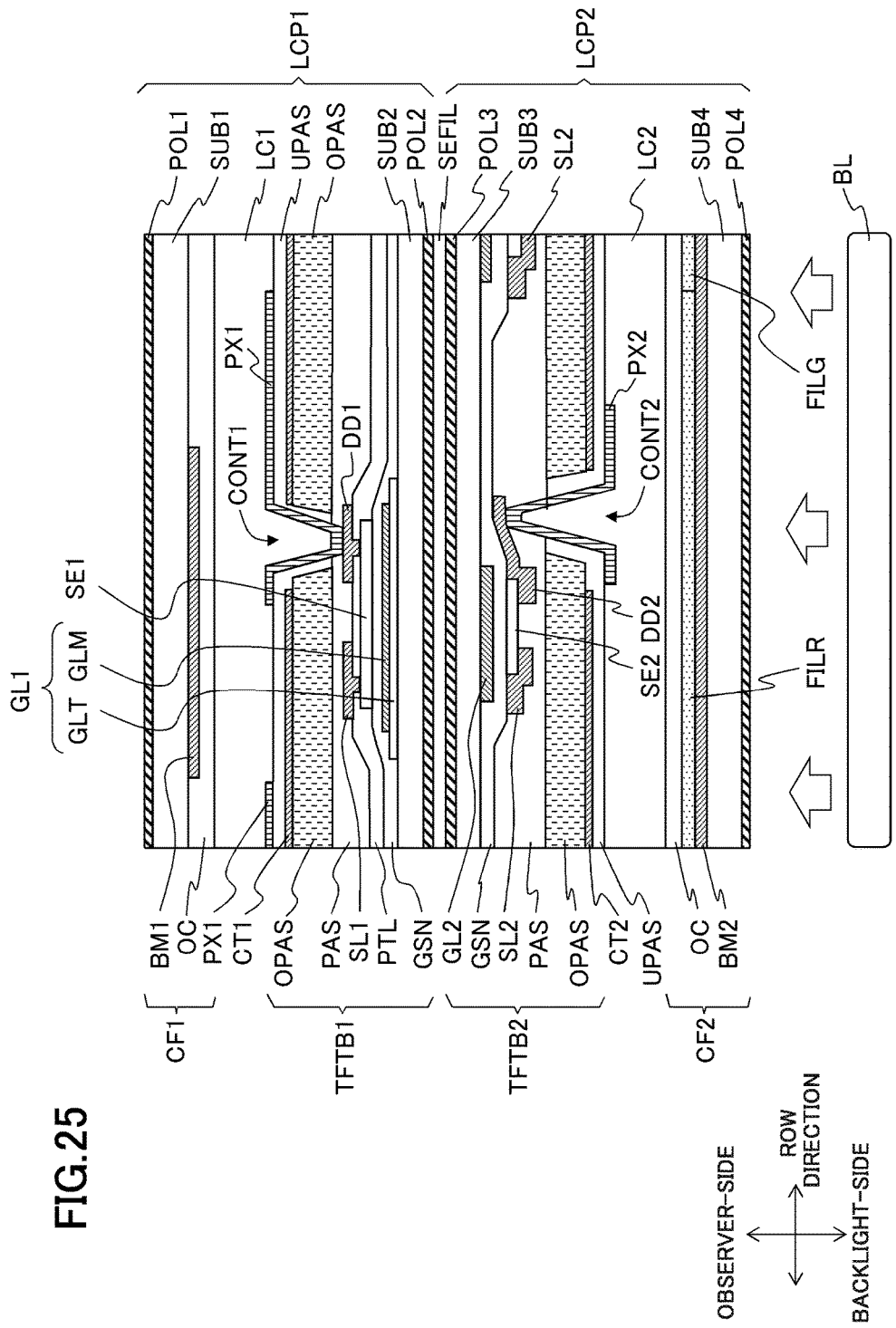
FIG. 25 is a sectional view when thin film transistors are cut in the row direction.
Figure 26:
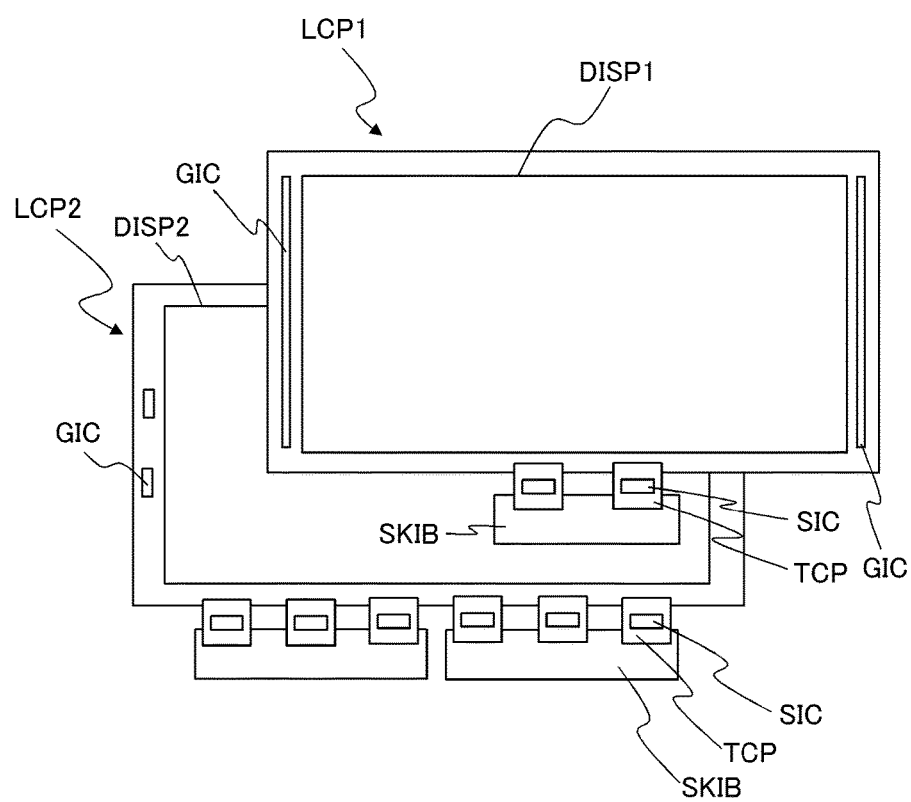
FIG. 26 is a view illustrating configurations of drivers of the front-side display panel and the rear-side second display panel according to the fifth exemplary embodiment.

FIG. 23 is a sectional view when openings of pixels PIX1, PIX2 are cut in the row direction, FIG. 24 is a sectional view when the openings are cut in the column direction, and FIG. 25 is a sectional view when thin film transistors TFT1, TFT2 are cut in the row direction. FIGS. 23 to 25 illustrate portions corresponding to FIGS. 10 to 12 illustrating the configuration of the first exemplary embodiment.

In thin film transistor substrate TFTB1 constituting pixel PIX1 of display panel LCP1, gate line GL1 (transparent gate line GIFT) made of a transparent electrode material is formed on transparent substrate SUB2. In a region constituting thin film transistor TFT1, gate electrode GM made of a metallic material is formed on transparent gate line GLT. Gate insulator GSN is formed so as to cover transparent gate line GLT and gate electrode GLM. Semiconductor layer SE1 made of oxide semiconductor containing indium (In), gallium (Ga), and zinc (Zn) is formed on gate insulator GSN, and protective film PTL is formed so as to cover semiconductor layer SE1. Source line SL2 (transparent source line SLT) (source electrode) and drain electrode DD1 that are made of a transparent electrode material are formed on protective film PTL, and parts of source electrode and drain electrode DD1 are connected to semiconductor layer SE1. Protective film PAS and organic insulator OPAS are formed so as to cover transparent source line SLT (source electrode) and drain electrode DD2. Common electrode CT1 is formed on organic insulator OPAS, and protective film UPAS is formed so as to cover common electrode CT1. Pixel electrode PX1 is formed on protective film UPAS, and an alignment film (not illustrated) is formed so as to cover pixel electrode PX1. Contact hole CONT1 is made in protective film PAS, organic insulator OPAS, and protective film UPAS, and a part of pixel electrode PX1 is electrically connected to drain electrode DD1 through contact hole CONT1. In counter substrate CF1, black matrix BM1 is formed into an island shape on transparent substrate SUB1 so as to cover a region where thin film transistor TFT1 is formed in planar view. Overcoat film OC is coated so as to cover black matrix BM1, and an alignment film (not illustrated) is formed on overcoat film OC.

In thin film transistor substrate TFTB2 constituting pixel PIX2 of display panel LCP2, gate line GL2 is formed on transparent substrate SUB3, and gate insulator GSN is formed so as to cover gate line GL2. Semiconductor layer SE2 made of amorphous silicon (a-Si), source line SL2 (source electrode), and drain electrode DD2 are formed on gate insulator GSN, and protective film PAS and organic insulator OPAS are formed so as to cover semiconductor layer SE2, source line SL2, and drain electrode DD2. Common electrode CT2 is formed on organic insulator OPAS, and protective film UPAS is formed so as to cover common electrode CT2. Pixel electrode PX2 is formed on protective film UPAS, and an alignment film (not illustrated) is formed so as to cover pixel electrode PX2. Contact hole CONT2 is made in protective film PAS, organic insulator OPAS, and protective film UPAS, and a part of pixel electrode PX2 is electrically connected to drain electrode DD2 through contact hole CONT2. In counter substrate CF2, black matrix BM2 and color filter FIL (red color filter FILR, green color filter FILG, and blue color filter FILB) are formed on transparent substrate SUB4. Overcoat film OC is coated on a surface of color filter FIL, and an alignment film (not illustrated) is formed on overcoat film OC.

As described above, in liquid crystal display device LCD of the fifth exemplary embodiment, thin film transistor substrate TFTB1 of display panel LCP1 and thin film transistor substrate TFPB2 of display panel LCP2 are disposed opposite each other, and counter substrate CF1 of display panel LCP1 and counter substrate CF2 of display panel LCP2 are disposed outside. In the examples of FIGS. 23 to 25, counter substrate CF1 is disposed on an observer side, and counter substrate CF2 is disposed on the side of backlight BL.

The liquid crystal display device of the present disclosure is not limited to the above configurations, but may have the following configurations.

For example, in liquid crystal display device LCD of the fifth exemplary embodiment, display panel LCP1 may include the configuration of display panel LCP2 of any one of the second to fourth exemplary embodiments.

For example, in display panel LCP1 of liquid crystal display device LCD of the second to fourth exemplary embodiments, gate line GL1 may be constructed with transparent gate line GLT, source line SL1 may be constructed with transparent source line SLT, liquid crystal layer LC1 may be constructed with negative type liquid crystal molecules LCBN, and pixel electrode may have an inclined shape (see FIG. 9). That is, in the liquid crystal display device of the present disclosure, the pixel electrode has the inclined shape at the boundary between the two pixel electrodes adjacent in the slit extending direction of the pixel electrode in at least one of display panel LCP1 and display panel LCP2. Preferably, the rotation direction of the liquid crystal molecules at the boundary and the rotation direction of the liquid crystal molecules in the pixel opening are identical to each other. Preferably, the rotation direction of the liquid crystal molecules of display panel LCP1 and the rotation direction of the liquid crystal molecules of display panel LCP2 are identical to each other.

For example, the liquid crystal display device of the present disclosure is not limited to the configuration of a plurality of display panels, but may have the configuration of one display panel. In this case, in display panel LCP, gate line GL may be constructed with transparent gate line GLT, source line SL may be constructed with transparent source line SLT, liquid crystal layer LC may be constructed with negative type liquid crystal molecules LCBN, and pixel electrode PX may have an inclined shape (see FIG. 9).

For example, in display panel LCP2 of the second to fourth exemplary embodiments, liquid crystal molecules LCBN overlapping the metallic wiring in planar view may rotate in the same direction as liquid crystal molecules LCBN overlapping the opening of pixel PX2, or not rotate.

For example, because a diffuser can be eliminated in liquid crystal display device LCD of each exemplary embodiment as described above, a flexible liquid crystal display device can also be constructed.

In the above, the specific embodiments of the present application have been described, but the present application is not limited to the above-mentioned embodiments, and various modifications may be made as appropriate without departing from the spirit of the present application.

What is claimed is:

1. A liquid crystal display device comprising:
a first display panel; and
a second display panel that is opposed to the first display panel,
wherein the first display panel includes: a plurality of first source lines extending in a first direction; a plurality of first gate lines extending in a second direction different from the first direction; a plurality of first pixels that are divided by the plurality of first source lines and the plurality of first gate lines; and a plurality of first pixel electrodes each of which is disposed in a corresponding one of the plurality of first pixels,
the second display panel includes: a plurality of second source lines extending in the first direction; a plurality of second gate lines extending in the second direction; a plurality of second pixels that are divided by the plurality of second source lines and the plurality of second gate lines; and a plurality of second pixel electrodes each of which is disposed in a corresponding one of the plurality of second pixels,
each of the plurality of second pixel electrodes is provided with a plurality of slits extending in the first direction, and includes: a first edge extending in the first direction; a second edge that is opposite to the first edge and extends in the first direction; a third edge that connects one ends of the first edge and the second edge; and a fourth edge that connects another ends of the first edge and the second edge,
at least one of the third edge and the fourth edge is inclined at predetermined angles with respect to the first direction and the second direction, and
wherein the inclined at least one of the third edge and the fourth edge partially overlaps with a corresponding one of the plurality of second gate lines.

2. The liquid crystal display device according to claim 1, wherein the other of the third edge and the fourth edge is inclined at predetermined angles with respect to the first direction and the second direction.

3. The liquid crystal display device according to claim 1, wherein the third edge and the fourth edge are parallel to each other.

4. The liquid crystal display device according to claim 1, wherein the first display panel displays color image and the second display panel displays black and white image.

5. The liquid crystal display device according to claim 1, wherein each of the plurality of second pixel electrodes has an outer shape of a parallelogram constructed with the first edge, the second edge, the third edge, and the fourth edge.

6. The liquid crystal display device according to claim 1, wherein
the first display panel includes a first liquid crystal layer having a plurality of first liquid crystal molecules,
the second display panel includes a second liquid crystal layer and a plurality of second liquid crystal molecules, and
a rotation direction of the second liquid crystal molecules overlapping at a boundary in planar view, the boundary being a region between two of the plurality of second pixel electrodes adjacent in the first direction, is identical to a rotation direction of the second liquid crystal molecules overlapping with the two of the plurality of second pixel electrodes in planar view.

7. The liquid crystal display device according to claim 6, wherein the rotation direction of the plurality of second liquid crystal molecules are identical to each other in a whole display region.

8. The liquid crystal display device according to claim 6, wherein the rotation direction of the second liquid crystal molecules overlapping with the two of the plurality of second pixel electrodes in planar view is identical to a rotation direction of the first liquid crystal molecules overlapping with a part of the plurality of first pixel electrodes which overlap with the two of the plurality of second pixel electrodes in planar view.

9. The liquid crystal display device according to claim 1, wherein at least one of the second source line and the second gate line is made of a light transmitting material.

10. The liquid crystal display device according to claim 9, wherein the other of the second source line and the second gate line includes a metallic wiring made of a metallic material that does not transmit light.

11. The liquid crystal display device according to claim 10, wherein a width of the metallic wiring is narrower than a width of the first source line or the first gate line, which overlaps the metallic wiring in planar view.

12. The liquid crystal display device according to claim 1, wherein each of the second source line and the second gate line includes a transparent wiring made of a light transmitting material and a metallic wiring overlapping the transparent wiring and being made of a metallic material that does not transmit light.

13. The liquid crystal display device according to claim 12, wherein
the first display panel further includes a black matrix, and
a width of the metallic wiring is less than or equal to one third of a width of the black matrix overlapping the metallic wiring in planar view.

14. The liquid crystal display device according to claim 12, wherein a second source line among the plurality of second source lines is disposed between adjacent two first source lines of the plurality of first source lines in planar view.

15. The liquid crystal display device according to claim 6, wherein
the plurality of first liquid crystal molecules are positive type liquid crystal molecules, and
the plurality of second liquid crystal molecules are negative type liquid crystal molecules.

16. The liquid crystal display device according to claim 1, wherein
the predetermined angles are larger than an angle formed between the second direction and an initial alignment direction of the plurality of second liquid crystal molecules.

17. The liquid crystal display device according to claim 6, wherein the first display panel and the second display panel are IPS type liquid crystal display panels.

* * * * *

UNITED STATES PATENT AND TRADEMARK OFFICE
CERTIFICATE OF CORRECTION

PATENT NO. : 10,503,028 B2
APPLICATION NO. : 15/877402
DATED : December 10, 2019
INVENTOR(S) : Kikuo Ono It is certified that error appears in the above-identified patent and that said Letters Patent is hereby corrected as shown below:

On the Title Page
In item (73), delete "Dispaly" and insert --Display--.

Signed and Sealed this
Tenth Day of March, 2020

Andrei Iancu
*Director of the United States Patent and Trademark Office*